United States Patent
Kumamoto

(10) Patent No.: US 8,243,031 B2
(45) Date of Patent: Aug. 14, 2012

(54) TOUCH PANEL CONTROL DEVICE, PICTURE-DRAWING DEVICE, DISPLAY FUNCTION-EQUIPPED COORDINATE INPUT DEVICE, AND TOUCH POSITION ACQUISITION DEVICE

(75) Inventor: Tetsushi Kumamoto, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 973 days.

(21) Appl. No.: 12/297,308

(22) PCT Filed: Apr. 17, 2007

(86) PCT No.: PCT/JP2007/058306
§ 371 (c)(1),
(2), (4) Date: Oct. 15, 2008

(87) PCT Pub. No.: WO2007/123097
PCT Pub. Date: Nov. 1, 2007

(65) Prior Publication Data
US 2009/0303194 A1 Dec. 10, 2009

(30) Foreign Application Priority Data

Apr. 17, 2006 (JP) .................... 2006-113919
Apr. 20, 2006 (JP) .................... 2006-116492
Apr. 27, 2006 (JP) .................... 2006-124510

(51) Int. Cl.
*G06F 3/041* (2006.01)
(52) U.S. Cl. ........................................ 345/173
(58) Field of Classification Search ............. None
See application file for complete search history.

(56) References Cited

U.S. PATENT DOCUMENTS

2002/0005824 A1  1/2002 Oshitani et al.

FOREIGN PATENT DOCUMENTS

| JP | 61143832 A | 7/1986 |
|---|---|---|
| JP | 62-194528 | 8/1987 |
| JP | 06-324787 | 11/1994 |
| JP | 07-013696 | 1/1995 |
| JP | 07302168 A | 11/1995 |
| JP | 09-069898 | 3/1997 |
| JP | 09-160719 | 6/1997 |
| JP | 09146681 A | 6/1997 |
| JP | 10-111749 | 4/1998 |
| JP | 10-312257 | 11/1998 |
| JP | 11353100 A | 12/1999 |
| JP | 2000-020474 | 1/2000 |
| JP | 2002-014623 | 1/2002 |
| JP | 2005-227409 | 8/2005 |

OTHER PUBLICATIONS

Machine translation of JP-07-013696, filed on Jan. 17, 1995.*

(Continued)

*Primary Examiner* — Paul Huber
(74) *Attorney, Agent, or Firm* — DLA Piper LLP (US)

(57) ABSTRACT

In order to restrict a decrease in processing speed due to an increase in bit length of a digital signal, a mobile telephone (1001) receives an input of a digital signal having a predetermined bit length indicating a coordinate of a user-specified position on an input surface of a touch panel (1300) in a predetermined resolution from the touch panel (1300) and converts the received digital signal into a digital signal having a bit length shorter than the predetermined bit length indicating the coordinate of the user-specified position on the input surface in a resolution lower than the predetermined resolution. The digital signal after conversion is used for a process of acquiring the user-specified position.

3 Claims, 16 Drawing Sheets

OTHER PUBLICATIONS

Japanese language office action dated Sep. 7, 2010 and its English language translation for corresponding Japanese application 2006124510 lists the references above.

Japanese language office action dated Sep. 7, 2010 and its English language translation for corresponding Japanese application 2006113919 lists the references above.

* cited by examiner

FIG.5

| HEADER | PAYLOAD | |
|---|---|---|
| | (X-AXIS DIRECTION) 10 BITS | (Y-AXIS DIRECTION) 10 BITS |

FIG.6

| HEADER | PAYLOAD | |
|---|---|---|
| | (X-AXIS DIRECTION) 8 BITS | (Y-AXIS DIRECTION) 8 BITS |

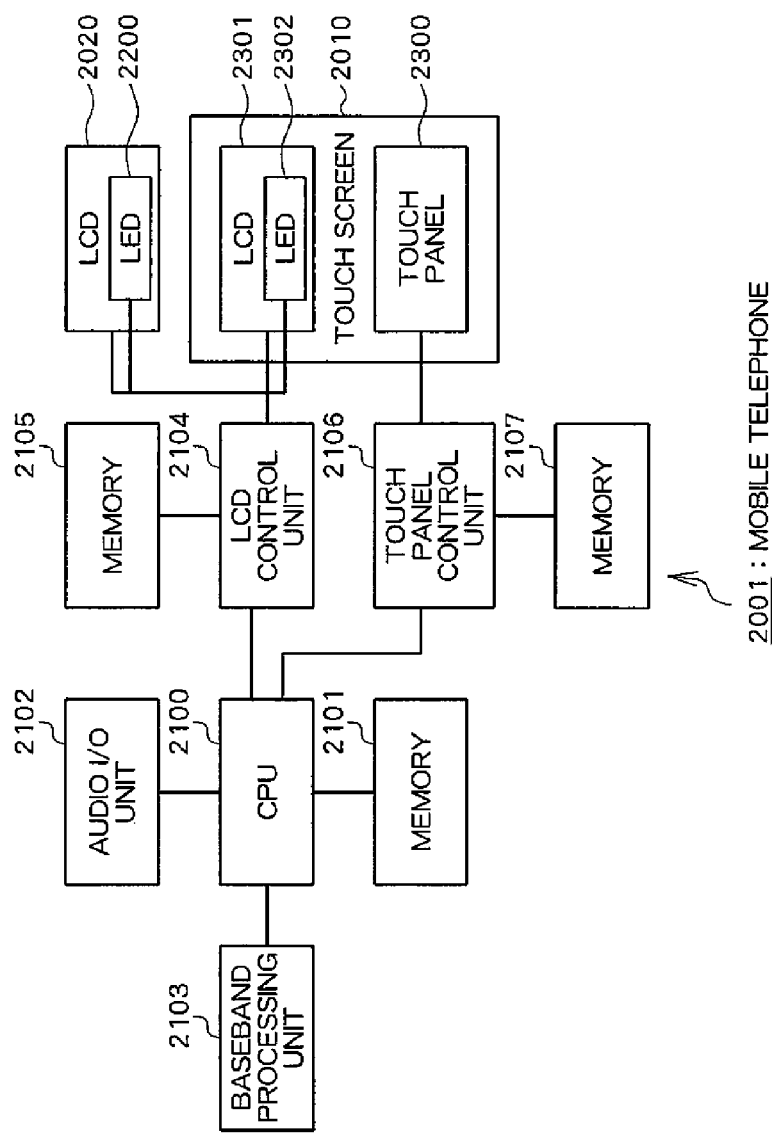

TOUCH PANEL CONTROL DEVICE, PICTURE-DRAWING DEVICE, DISPLAY FUNCTION-EQUIPPED COORDINATE INPUT DEVICE, AND TOUCH POSITION ACQUISITION DEVICE

This application is a 371 of PCT/JP2007/058306, filed Apr. 17, 2007.

TECHNICAL FIELD

The present invention relates to a touch panel control device and a picture-drawing device, and more particularly, to a technology for restricting a decrease in processing speed thereof. Moreover, the present invention relates to a display function-equipped coordinate input device, and more particularly, to a technology for reducing power consumption thereof. Further, the present invention relates to a touch position acquisition device, and more particularly, to increasing precision of calculation of a touch position on an analog resistive touch panel.

BACKGROUND ART

Some computers use a touch panel as an input device. The touch panel is an input device provided with an input surface, and outputs a digital signal having a predetermined bit length indicating, in a predetermined resolution, a coordinate of a position touched by a user (user-specified position) on the input surface to a touch panel control device of the computer. Patent Document 1 and Patent Document 2 disclose specific examples of the touch panel.

Recently, the resolution of touch panels has increased, and, accordingly, the bit length of the digital signal output from the touch panel has increased. Specifically, there are touch panels which indicate one coordinate in ten bits.

Patent Document 1: JP 2000-20474 A
Patent Document 2: JP 10-312257 A

Moreover, some recent computers function as a display function-equipped coordinate input device in which an input surface (such as touch panel) of the coordinate input device is used as display means such as a display device. The display function-equipped coordinate input device consumes a large amount of power especially when the display function carries out displaying, and, when the computer is used as the display function-equipped coordinate input device, a reduction in power consumption becomes a problem, and, in order to solve this problem, various attempts have been made.

In an example, there are provided a normal operation mode, and a low power consumption mode for restricting the power consumption by stopping the display function. The normal operation mode transitions, when a user-specified operation has not been detected on an input surface for a predetermined period of time, to the low power consumption mode, and, when the user-specified operation is detected on the input surface, the low power consumption mode transitions to the normal operation mode (refer to, for example, Patent Document 3).

Patent Document 3: JP 10-111749 A

Moreover, an analog resistive touch panel has two resistive films for respectively detecting an X-axis position and a Y-axis position, and detects a touch position by means of resistance division of the resistive films for the X axis and the Y axis. Referring to drawings, a description thereof is now given.

FIG. 19 is a diagram showing an equivalent circuit for an X-axis position detection circuit or a Y-axis position detection circuit of an ideal analog resistive touch panel 3400. As shown in the drawing, the touch panel 3400 is provided with a resistive film (resistance $R_T$) from one end to the other end, and a DC voltage $V_D$ is applied on the resistive film $R_T$. The touch panel 3400 is configured so that, when a touch surface is touched, a voltage V applied at a depressed position is acquired. According to the voltage V thus acquired, a resistance $R_{T1}$ from a grounded point to the touch position (resistance dividing point) is calculated. Specifically, the resistance $R_{T1}$ is calculated by the following Equation 1.

$$R_{T1} = R_T \times V/V_D \tag{1}$$

The touch position of the touch panel 3400 is calculated based on the resistance $R_T$ and the resistance $R_{T1}$ thus acquired respectively for the X axis and the Y axis.

The touch panel 3400 shown in FIG. 19 is the ideal touch panel which does not have electric resistances in wiring. However, the wiring actually has electric resistances, and an equivalent circuit thereof is represented as a touch panel 3401 (FIG. 20). In this case, the resistance $R_{T1}$ is given by Equation 2. It should be noted that $V_1$ and $V_2$ are respectively a voltage applied on an end on the ground point side of the resistor $R_T$, and a voltage applied on an end on a power supply side of the resistor $R_T$.

$$R_{T1} = R_T \times (V-V_1)/(V_2-V_1) \tag{2}$$

In this way, actually, the resistance $R_{T1}$ is calculated based on the voltages ($V_1$ and $V_2$) applied on both ends of the resistive film.

It should be noted that resistances $R_1$ and $R_2$ of the wiring shown in FIG. 20 change according to the use environment and the period of use. When those changes occur, the voltages applied on both ends of the resistive film change accordingly. Thus, the voltages ($V_1$ and $V_2$) applied on both ends of the resistive film are measured and saved when the power supply is turned on, upon a reset, when the stop mode is released, or when a touch operation has not been carried out, for example, the touch input or command transmission has not been carried out for thirty seconds, and are used for the calculation according to Equation 2 when a touch operation is carried out.

Further, in a technology described in Patent Document 4, presence or absence of a touch operation is detected periodically (at intervals of 50 ms), voltages applied on both ends of resistive films are measured and saved when a touch operation is not carried out, and, when a touch operation is carried out, the saved voltages are used as correction data for the touch position.

Patent Document 4: JP 09-160719 A

DISCLOSURE OF THE INVENTION

Problems to be Solved by the Invention

Generally, a touch panel carries out an output on a one-byte (eight-bit) basis, and a touch panel control device also carries out information processing bytewise. As a result, as described above, when one coordinate is represented by a digital signal of ten bits, the touch panel control device finishes processing for one coordinate by carrying out information processing twice, resulting in a decrease in processing speed compared with a case in which one coordinate is represented by a digital signal of eight bits.

Moreover, in the above-mentioned conventional technologies, even when a user touches the input surface by mistake, the low power consumption mode transitions to the normal operation mode. In this case, there arises a problem that the electric power is wasted.

This problem is not limited to the display function-equipped coordinate input device which uses the input surface of the coordinate input device as the display means, and a similar problem occurs in a display function-equipped coordinate input device such as a touch panel-equipped mobile telephone in which an input surface of a coordinate input device and the display means are separated.

Moreover, as in the technology described in Patent Document 4, when the voltages ($V_1$ and $V_2$) are measured and saved when the power supply is turned on, upon a reset, or the like, the voltages ($V_1$ and $V_2$) may have changed by the time when a touch operation is carried out, resulting in imprecise calculation of the touch position. Moreover, the technology described in Patent Document 4 requires a touch panel control unit for detecting presence or absence of a touch operation at short time intervals (50 ms). Thus, it is necessary, each time when a touch operation is not carried out, to newly measure the voltages applied on both ends of resistive films, and to save new correction data. Thus, a large amount of power is consumed for this processing, and it is desirable especially for mobile telephones or the like having a battery as a power supply to reduce the power consumed by this process.

It is therefore a first object of the present invention to provide a touch panel control device and a picture-drawing device capable of restricting the decrease in processing speed due to the increase in bit length of the digital signal.

It is a second object of the present invention to provide a display function-equipped coordinate input device capable of restricting the transition to the normal operation mode due to a touch by mistake on the input surface.

It is a third object of the present invention to provide a touch position acquisition device which is equipped with an analog resistive touch panel for acquiring a position touched by a touch operation, precisely calculates the touch position independently of a change in resistances of wiring, and realizes low power consumption.

Means for Solving the Problems

According to the present invention, in order to attain the first object, a touch panel control device includes: digital signal input reception means for receiving, from a touch panel, an input of a digital signal having a predetermined bit length indicating, in a predetermined resolution, a coordinate of a user-specified position on an input surface of the touch panel; and digital signal conversion means for converting the digital signal received by the digital signal input reception means into a digital signal having a bit length shorter than the predetermined bit length indicating, in a resolution lower than the predetermined resolution, the coordinate of the user-specified position on the input surface. The digital signal after conversion carried out by the digital signal conversion means is used for a process of acquiring the user-specified position.

With this configuration, since the touch panel control device reduces the bit length of the digital signal, it is possible to restrict the decrease in processing speed due to the increase in bit length of the digital signal.

Further, in the touch panel control device, the digital signal received by the digital signal input reception means indicates, in a part thereof, the coordinate of the user-specified position on the input surface in the resolution lower than the predetermined resolution, and the digital signal after the conversion carried out by the digital signal conversion means may include the part of the digital signal before the conversion.

With this configuration, it is possible, by the simple processing of acquiring the part of the plurality of bits constituting the digital signal, to convert the digital signal.

Further, the touch panel control device may further include user-specified position acquisition means for acquiring the user-specified position based on any one of the digital signal received by the digital signal input reception means and the digital signal after the conversion carried out by the digital signal conversion means, according to the user-specified position.

For example, the input surface may be provided with a handwriting area for enabling writing of arbitrary graphics thereupon. When a user carries out writing on this handwriting area, and when the processing speed is low, the display cannot follow the motion of the hand, and the user feels stressed. Therefore, in the handwriting area, the processing speed is emphasized more than the precision in the user-specified position.

With the above-mentioned touch panel control device, depending on whether a user-specified position is in the area in which the processing speed is emphasized more than the precision in the user-specified position, it is possible to acquire the user-specified position based on any one of the digital signal before the conversion and the digital signal after the conversion. In other words, according to necessity, it is possible to restrict the decrease in processing speed due to the increase in bit length of the digital signal.

Further, a picture-drawing device according to the present invention includes: the touch panel control device, the touch panel including a picture-drawing area for inputting an arbitrary graphic and another area; and area determination means for determining whether the user-specified position is in the picture-drawing area or in the another area. The user-specified position acquisition means is configured to: acquire, when the area determination means determines that the user-specified position is in the picture-drawing area, the user-specified position based on the digital signal after the conversion carried out by the digital signal conversion means; and acquire, when the area determination means determines that the user-specified position is in the another area, the user-specified position based on the digital signal received by the digital signal input reception means.

With this configuration, when a user-specified position is in the picture-drawing area, it is possible to restrict the decrease in processing speed due to the increase in bit length of the digital signal, and, when a user-specified position is in the other area, it is possible to precisely acquire the position.

Further, the picture-drawing device may further include rendering processing means for carrying out, when the area determination means determines that the user-specified position is in the picture-drawing area, a predetermined rendering process based on the user-specified position acquired by the user-specified position acquisition means.

Further, in the picture-drawing device, the another area is an icon area provided with one or more icons for operation specification. The picture-drawing device may further include icon processing means for detecting, when the area determination means determines that the user-specified position is in the another area, based on the user-specified position acquired by the user-specified position acquisition means, the icon touched by a user among the one or more icons, and carrying out a process relating to the icon.

According to the present invention, in order to attain the second object, a display function-equipped coordinate input device, which is a coordinate input device including display means, includes: user-specified operation detection means for detecting a user-specified operation carried out on an input surface; coordinate acquisition means for acquiring a coordinate indicating a position on the input surface specified by the user-specified operation detected by the user-specified operation detection means; determination means for determining whether one or more coordinates acquired by the coordinate acquisition means meet a predetermined condition; and display means operation restriction means for restricting, based on a result determined by the determination means, an operation of the display means.

With this configuration, it is possible to restrict the operation of the display means according to whether the coordinate meets the predetermined condition. For example, only when user-specified positions form a triangle, it is possible to restrict the operation of the display means. As a result, it is possible to restrict the transition to the normal operation mode due to a touch by mistake.

Further, the display function-equipped coordinate input device further includes pattern image information storage means for storing pattern image information indicating a pattern image. The determination means may determine whether the one or more coordinates acquired by the coordinate acquisition means constitute the pattern image indicated by the pattern image information stored in the pattern image information storage means.

With this configuration, it is possible to restrict the operation of the display means according to whether or not the coordinates constitute a pattern image.

Further, the display function-equipped coordinate input device may further include: illumination means for illuminating the input surface; and illumination means control means for controlling the illumination means according to whether the user-specified operation detection means detects the user-specified operation.

With this configuration, since it is possible to illuminate the input surface while the user is carrying out the specification operation, it is possible to prevent the user from carrying out an operation by mistake such as specifying a position outside the input surface when the user should specify a position on the input surface.

According to the present invention, in order to attain the third object, a touch position acquisition device provided with an analog resistive touch panel for acquiring a position touched by a touch operation includes: holding means for holding a voltage applied on a touch position on a resistive film of the analog resistive touch panel, and voltages applied on both ends of the resistive film; touch position calculation means for calculating a touch position on the analog resistive touch panel based on the respective voltages held by the holding means; touch operation detection means for detecting the touch operation carried out on the analog resistive touch panel; measuring means for respectively measuring the voltage applied on the touch position on the resistive film, and the voltages applied on the both ends of the resistive film; and measurement control means for causing the holding means to hold a result of measurement carried out by the measuring means while the touch operation detection means is detecting the touch operation.

With this configuration, since the voltages applied on the both ends of the resistive film are measured, the touch position acquisition device can precisely calculate the touch position without the influence of the change in resistances of the wiring, and since the voltages applied on both ends of the resistive film are measured according to necessity, it is possible to realize low power consumption.

Further, in the touch position acquisition device, the analog resistive touch panel includes two resistive films including a resistive film for detecting an X-axis position, and a resistive film for detecting a Y-axis position, the holding means holds a voltage applied on a touch position of the resistive film for detecting the X-axis position and voltages applied on both ends thereof, and a voltage applied on a touch position of the resistive film for detecting the Y-axis position and voltages applied on both ends thereof, and the measurement control means may include: switching means for switching the voltage applied on the touch position of the resistive film for detecting the X-axis position and the voltages applied on the both ends of the resistive film, and the voltage applied on the touch position of the resistive film for detecting the Y-axis position and the voltages applied on the both ends of the resistive film, which are measured by the measuring means, at a given timing while causing the holding means to hold the voltages; and switching control means for controlling the timing of the switching carried out by the switching means according to a timing of detection of the touch operation carried out by the touch operation detection means.

With this configuration, it is possible to measure the voltage applied along the X axis, and the voltage applied along the Y axis while switching the measurement timings thereof.

BRIEF DESCRIPTION OF THE INVENTION

FIG. 5 is a diagram showing an output digital signal before a conversion according to the first embodiment of the present invention.

FIG. 6 is a diagram showing an output digital signal after the conversion according to the first embodiment of the present invention.

FIG. 8 is a diagram showing a system configuration of the mobile telephone according to the second embodiment of the present invention.

FIG. 9 is a diagram showing an initial state of a screen displayed on a touch screen according to the second embodiment of the present invention.

BEST MODE FOR CARRYING OUT THE INVENTION

Referring to drawings, a description is now given of embodiments of the present invention.

First Embodiment

Figure 1:
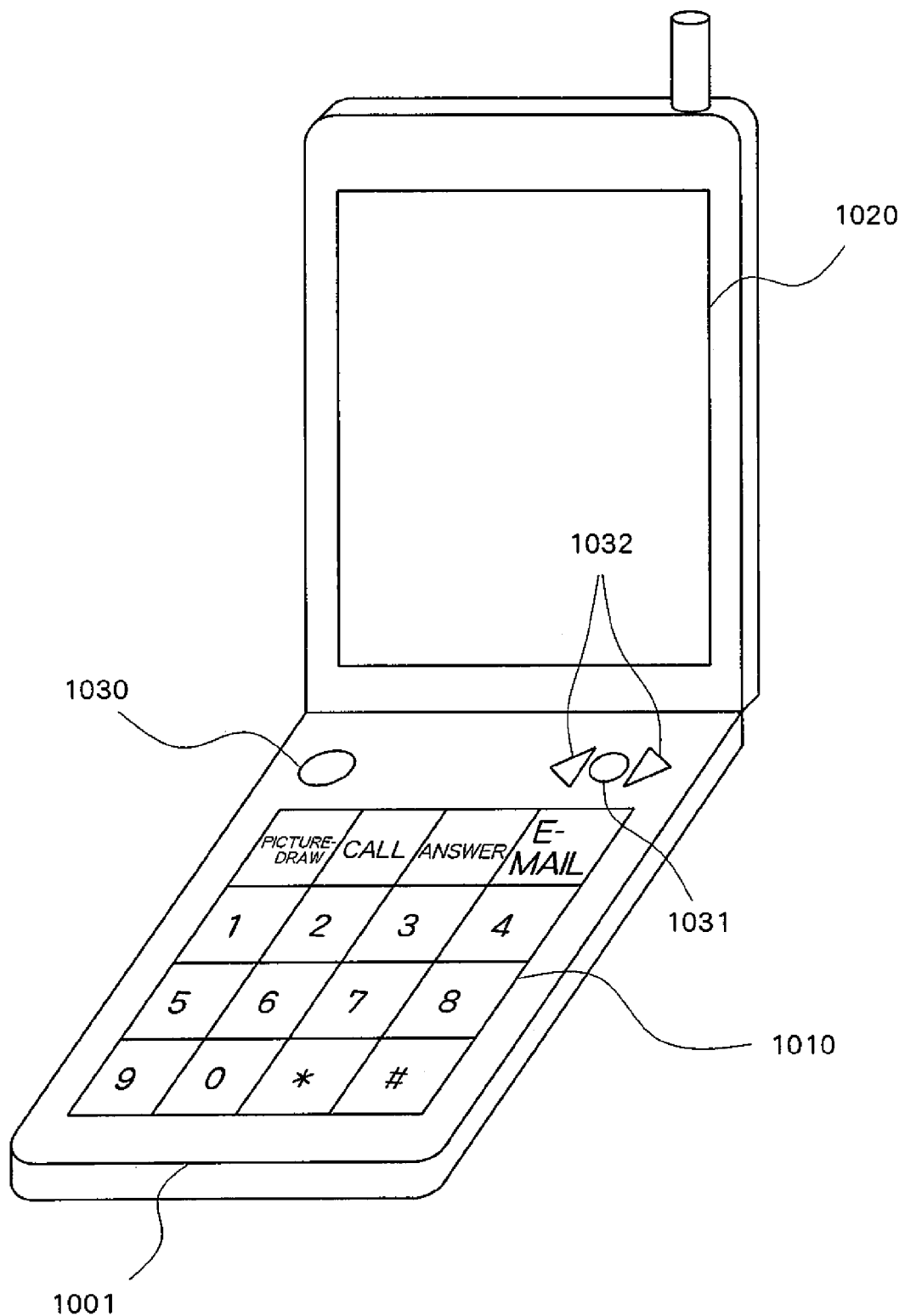
FIG. 1 is a diagram showing an exterior of a mobile telephone according to a first embodiment of the present invention.

FIG. 1 is a diagram showing an exterior of a mobile telephone 1001 according to a first embodiment of the present invention. The mobile telephone 1001 is a flip type mobile telephone functioning as a touch panel control device, and includes a touch screen 1010, a liquid crystal display (LCD) 1020, a power button 1030, a select button 1031, and a scroll button 1032.

Figure 2:
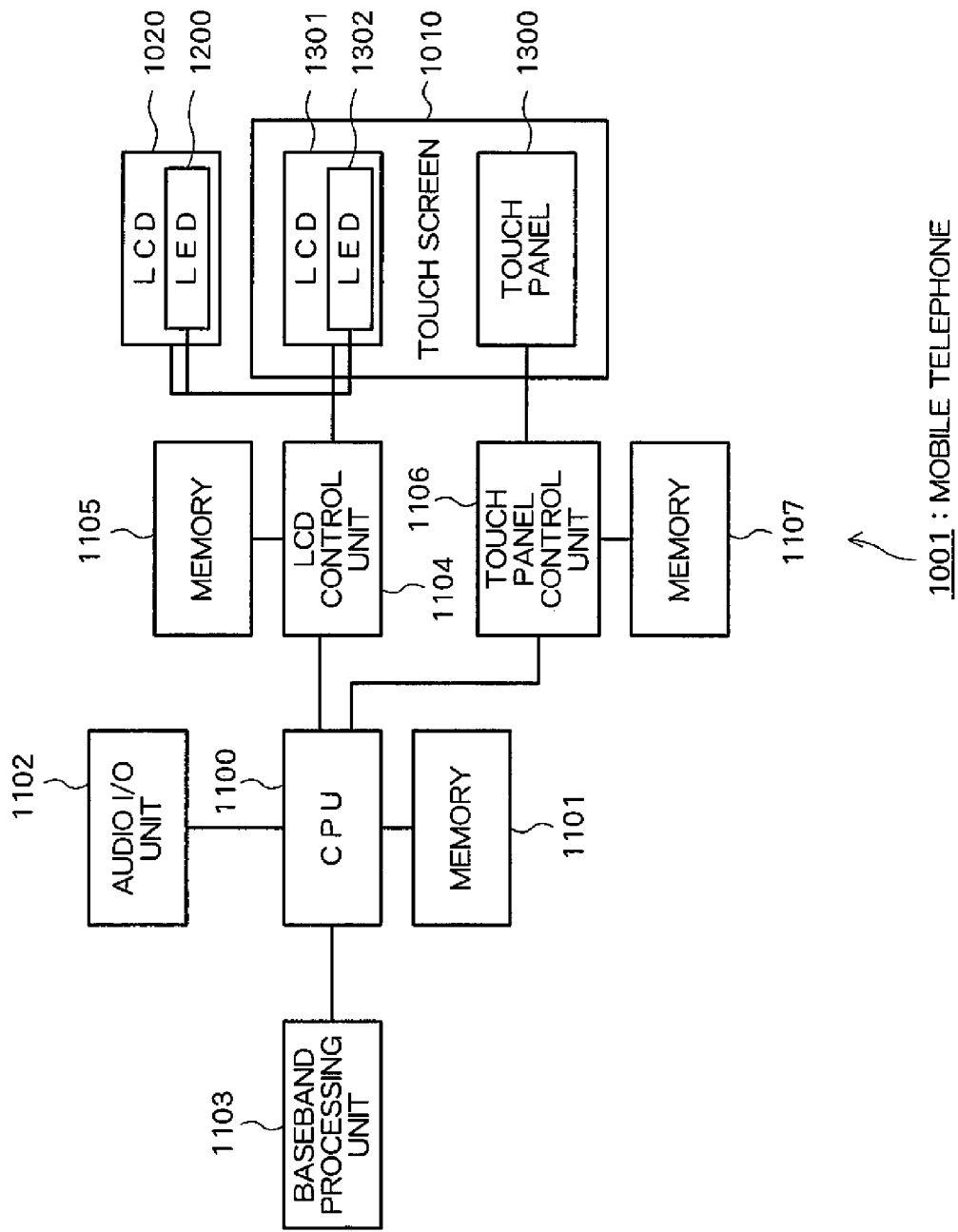
FIG. 2 is a diagram showing a system configuration of the mobile telephone according to the first embodiment of the present invention.

Moreover, FIG. 2 is a diagram showing a system configuration of the mobile telephone 1001. As shown in FIG. 2, the mobile telephone 1001 includes a CPU 1100, a memory 1101, an audio I/O unit 1102, a baseband processing unit 1103, an LCD control unit 1104, a memory 1105, a touch panel control unit 1106, a memory 1107, the touch screen 1010, and the LCD 1020.

The CPU 1100 carries out processing relating to control of respective components and communications of the mobile telephone 1001. The memory 1101 stores various types of data used in the processing carried out by the CPU 1100.

The audio I/O unit 1102 is provided with a microphone and a loudspeaker, collects audio generated by a user, and outputs the audio as an electric signal to the CPU 1100, converts an electric signal input from the CPU 1100 into audio, and outputs the audio.

The baseband processing unit 1103 receives a radio signal from a base station device (not shown), converts the received radio signal into a signal at a predetermined frequency (baseband frequency), and outputs the signal to the CPU 1100. Moreover, the baseband processing unit 1103 converts a signal input from the CPU 1100 into a radio signal, and transmits the converted signal to the base station device.

The touch screen 1010 is provided with a touch panel 1300, and further, an input surface thereof functions as an LCD 1301 which is a display device. When the user touches an input surface, the touch panel 1300 acquires a digital signal having a predetermined bit length (10 bits in this case) indicating, in a predetermined resolution, a coordinate of the touch position (user-specified position) on the input surface, and outputs the digital signal to the touch panel control unit 1106. The LCD 1301 displays information according to instructions of the LCD control unit 1104.

The LCD 1020 is also a display device for displaying information according to the instructions of the LCD control unit 1104. As described above, the touch screen 1010 is also provided with the display device, and thus, the mobile telephone 1001 is provided with two display devices.

The LCD 1301 and the LCD 1020 are provided with a light-emitting diode (LED) 1302 and an LED 1200, respectively. Both the LED 1302 and the LED 1200 function as backlights.

The touch panel control unit 1106 controls the touch panel 1300. The memory 1107 stores various types of data used for the processing carried out by the touch panel control unit 1106.

The touch panel control unit 1106 receives an input of the digital signal from the touch panel 1300. The touch panel control unit 1106 converts the digital signal thus received into a digital signal showing the coordinate of the touch position on the input surface while employing a shorter bit length (eight bits in this case) than the predetermined bit length (ten bits) in a resolution lower than the predetermined resolution. Moreover, according to the touch position indicated by the digital signal, the touch panel control unit 1106 outputs the digital signal either before or after the conversion to the CPU 1100. The CPU 1100, using the digital signal thus input from the touch panel control unit 1106, acquires coordinate information indicating the touch position on the input surface.

The LCD control unit 1104 controls the LCD 1301 and the LCD 1020. Moreover, the LCD control unit 1104 causes the LCD 1020 or the LCD 1301 to display information input from the CPU 1100. The memory 1105 stores various types of data used for the processing carried out by the LCD control unit 1104.

A description is now given of functions relating to operations of the mobile telephone 1001 carried out by the user.

The power button 1030, the select button 1031, and the scroll button 1032 are operation means provided for the mobile telephone 1001 as hardware. On the other hand, the touch screen 1010 realizes operation means based on software. A detailed description is now given of those means.

The power button 1030 is a push button used to turn on/off a power supply of the mobile telephone 1001. By the user depressing the power button 1030, the power supply of the mobile telephone 1001 is switched between on and off.

The select button 1031 and the scroll button 1032 are used when the user selects an object (such as an icon or link) displayed on the LCD 1020. In other words, the user highlights any one of one or more objects displayed on the LCD 1020 by means of the scroll button 1032. When the user depresses the select button 1031 while a certain object is being highlighted, the CPU 1100 starts processing associated with this object.

A description is next given of operation means realized by the touch screen 1010. FIG. 1 shows an initial state of the screen (initial screen) displayed on the LCD 1301, namely an input surface of the touch panel 1300. As shown in FIG. 1, in the initial state, respective icons of "Picture-draw", "Call", "Answer", "E-MAIL", "0" to "9", "*", and "#" are displayed on the LCD 1301.

When the user touches the "Call" icon, the CPU 1100 acquires coordinate information indicating the coordinate at which the "Call" icon is displayed. Based on the fact that this coordinate information has been acquired, the CPU 1100 detects that the "Call" icon has been touched, and starts a calling process.

On this occasion, the user specifies a phone number of the calling destination or the like by touching the respective icons of "0" to "9", "*", or "#". Also on this occasion, the CPU 1100 acquires coordinate information indicating the coordinates at which the icons touched by the user are displayed. Based on the fact that this coordinate information has been acquired, the CPU 1100 detects that the respective icons of "0" to "9", "*", or "#", have been touched.

When the user touches the "Answer" icon, the CPU 1100 acquires coordinate information indicating the coordinate at which the "Answer" icon is displayed. Based on the fact that this coordinate information has been acquired, the CPU 1100 detects that the "Answer" icon has been touched. When the CPU 1100 detects that the "Answer" icon is touched while there is an incoming call, the CPU 1100 starts an answering process.

When the user touches the "E-MAIL" icon, the CPU 1100 acquires coordinate information indicating the coordinate at which the "E-MAIL" icon is displayed. Based on the fact that this coordinate information has been acquired, the CPU 1100 detects that the "E-MAIL" icon has been touched, and starts a predetermined process relating to the electronic mail.

When the user touches the "Picture-draw" icon, the CPU 1100 acquires coordinate information indicating the coordinate at which the "Picture-draw" icon is displayed. Based on the fact that this coordinate information has been acquired, the CPU 1100 detects that the "Picture-draw" icon has been touched, and causes the screen displayed on the LCD 1301 to transition from the initial state to an "Character-inputting/Picture-drawing" screen.

Figure 3:
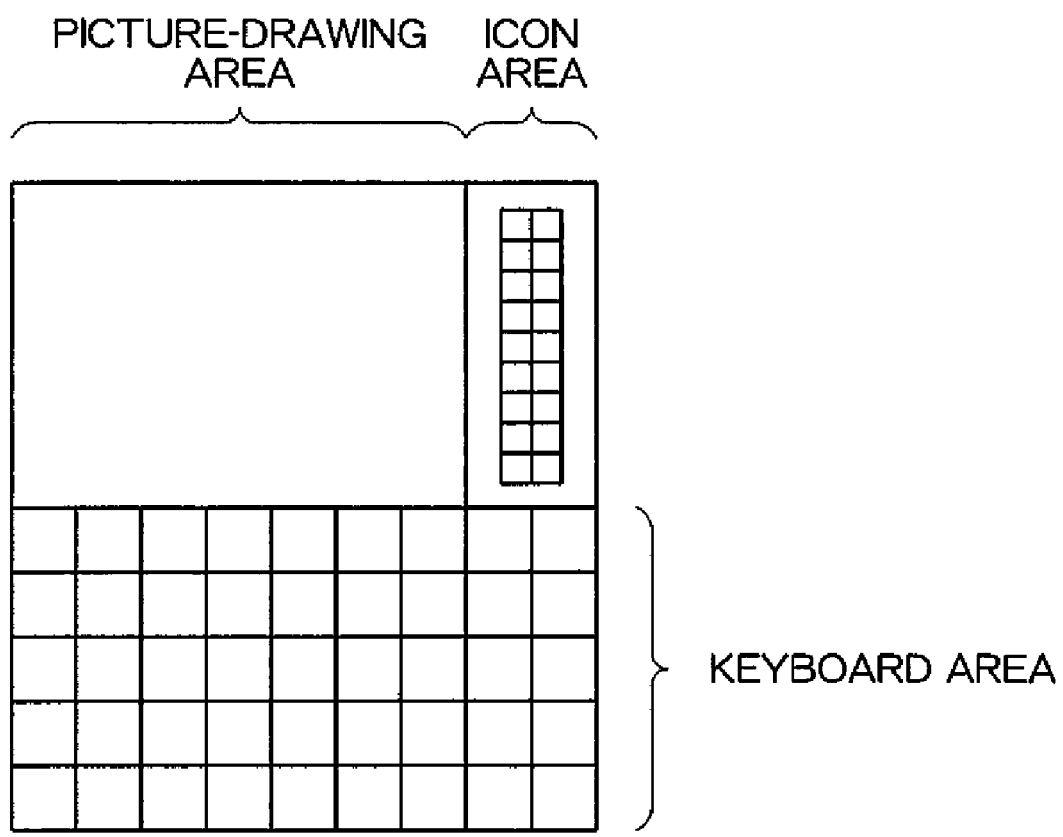
FIG. 3 is a diagram showing an example of an "Character-inputting/Picture-drawing" screen according to the first embodiment of the present invention.

FIG. 3 is a diagram showing an example of the "Character-inputting/Picture-drawing" screen displayed on the LCD 1301. As shown in FIG. 3, on the "Character-inputting/Picture-drawing" screen, an icon area, a picture-drawing area, and a keyboard area are provided. In the icon area, a calling icon, an answering icon, a line width selection icon, an eraser icon, a color/non-color specification icon, a color selection icon, and the like are displayed. When the user touches this icon area, the CPU 1100 detects an icon touched by the user among the respective icons, and carries out a process associated with this icon.

Processes carried out by the CPU 1100 when the user touches the calling icon and the answering icon are the same as the processes carried out when the user, on the initial screen, touches the "Call" icon and the "Answer" icon.

The picture-drawing area is constituted by a plurality of dots. The user successively moves the touch position, thereby inputting characters and pictures according to trajectories thereof. On this occasion, the CPU 1100 successively acquires the coordinate information according to the respective touch positions, and carries out a predetermined rendering process based on the coordinate information.

Specifically, based on the coordinate information, the CPU 1100 acquires dots touched by the user among the respective dots constituting the picture-drawing area.

The user selects, by means of the line width selection icon, the thickness of a line used for writing a character or drawing a picture in the picture-drawing area. The CPU 1100, according to the width of the line selected by the user, acquires dots based on the coordinate information.

Moreover, the user, by means of the color/non-color specification icon, specifies whether or not colors are used.

When the user specifies that colors are to be used, the memory 1101 associates the respective dots constituting the picture-drawing area and color information (information indicating in which color of black, white, red, yellow, blue, transparent, and the like the dots are drawn) with each other, and stores the dots and the color information. It should be noted that this color information may be information on grayscale. Further, the user specifies the color by means of the color selection icon. The CPU 1100 associates the dots acquired as described above and the color specified by the color selection icon selected when the dots are acquired with each other, and stores the dots and the color in the memory 1101.

It should be noted that the user can also specify an eraser mode by means of the eraser icon. While the eraser mode is specified, the CPU 1100 associates the dots acquired as described above and the transparent color with each other, and stores the dots and the transparent color in the memory 1101.

When the user specifies that the colors are not to be used, the memory 1101 associates the respective dots constituting the picture-drawing area and touch information indicating a touch or no-touch information indicating no touch with each other, and stores the dots and the touch or no-touch information. The CPU 1100 associates the dots acquired as described above and the touch information with each other, and stores the dots and the touch information in the memory 1101.

In this case, when the user wants to change the touch information, which is associated with the respective dots and stored, to the no-touch information, the user specifies the eraser mode by means of the eraser icon. While the eraser mode is specified, the CPU 1100 associates the dots acquired as described above and the no-touch information with each other, and stores the dots and the no-touch information in the memory 1101.

The CPU 1100 carries out a display on the LCD 1301 based on the contents stored in the memory 1101. The CPU 1100 carries out the rendering process as described above.

Then, a detailed description is next given of a process carried out by the touch panel control unit 1106 when the "Character-inputting/Picture-drawing" screen is displayed on the LCD 1301.

Figure 4:
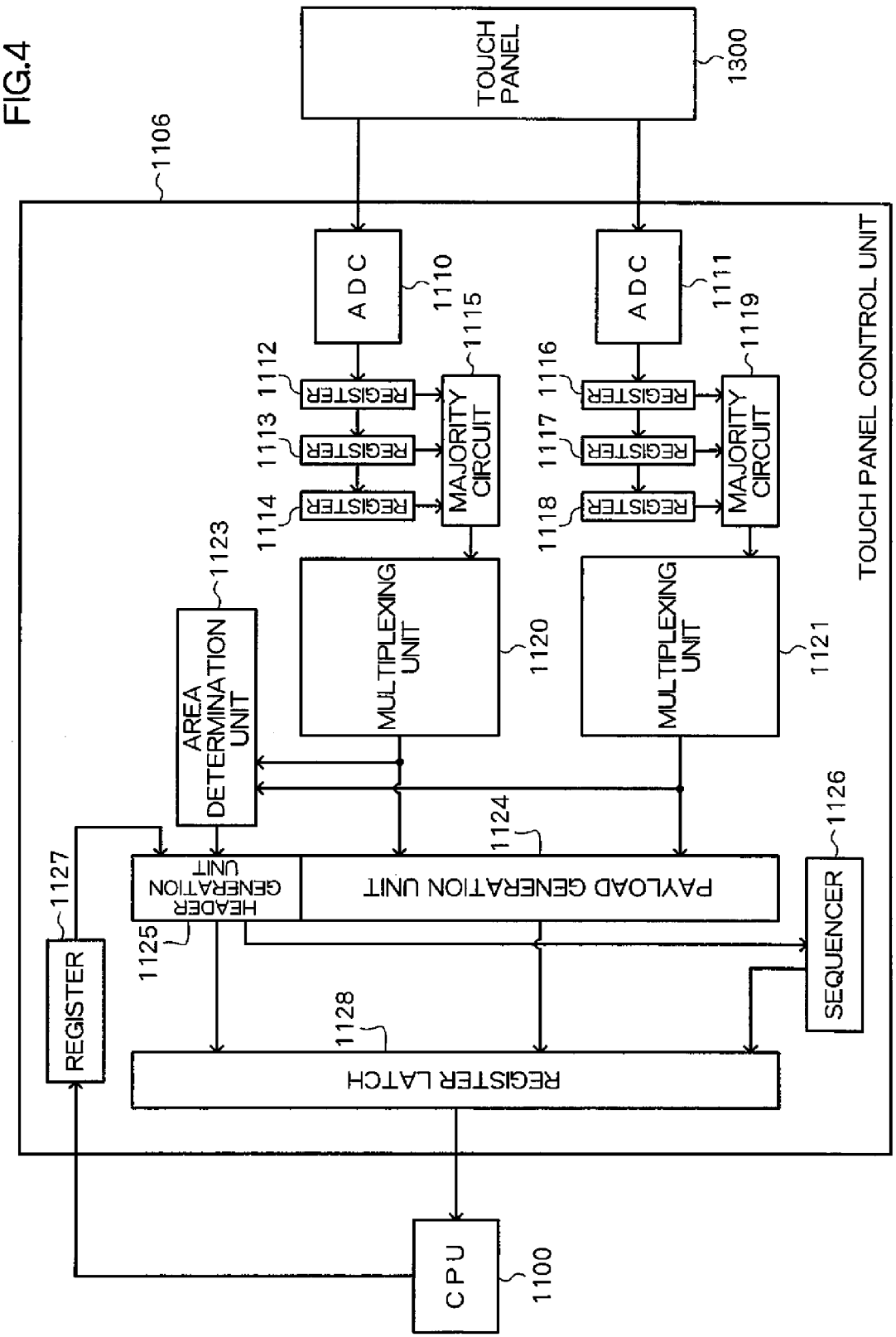
FIG. 4 is a diagram showing a functional block of a touch panel control unit according to the first embodiment of the present invention.

FIG. 4 is a diagram showing a functional block of the touch panel control unit 1106. As shown in FIG. 4, the touch panel control unit 1106 includes analog-to-digital converters (ADCs, AD converters) 1110 and 1111, registers 1112 to 1114, 1116 to 1118, majority circuits 1115 and 1119, multiplexing units 1120 and 1121, an area determination unit 1123, a payload generation unit 1124, a header generation unit 1125, a sequencer 1126, a register 1127, and a register latch 1128.

The touch panel 1300 has the rectangular input surface, and in the following description, one direction thereof is referred to as an X-axis direction, and a direction orthogonal to the X-axis direction is referred to as a Y-axis. The touch panel 1300 acquires resistance values corresponding to positions on the input surface touched by the user successively for the X-axis direction and the Y-axis direction a predetermined number of times (three times in this case), respectively, and outputs the resistance values to the ADC 1110 and ADC 1111, respectively.

The ADC 1110 and the ADC 1111 convert the resistance values input from the touch panel 1300 into digital signals. In the following description, the digital signal acquired from one resistance value is referred to as a unit digital signal. On this occasion, the bit length of this unit digital signal is 10 bits. The touch panel control unit 1106 receives an input of the unit digital signal output from the touch panel 1300. The ADC 1110 and the ADC 1111 output the unit digital signals acquired by the conversion to the register 1112 and register 1116, respectively.

The respective registers 1112 to 1114 store the input unit digital signals. When the register 1112, while holding a unit digital signal, receives an input of a next unit digital signal, the register 1112 outputs the stored unit digital signal to the register 1113. When the register 1113, while holding a unit digital signal, receives an input of a next unit digital signal, the register 1113 outputs the stored unit digital signal to the register 1114. When the register 1114, while holding a unit digital signal, receives an input of a next unit digital signal, the register 1114 discards the stored unit digital signal. As a result, unit digital signals representing respective three resistance values acquired three times by the touch panel 1300 are stored in the registers 1112 to 1114, respectively.

The majority circuit 1115 decides a bitwise majority of the unit digital signals stored in the registers 1112 to 1114, respectively. As a result, the majority circuit 1115 outputs a bitwise value which appears twice or more as a true value to the multiplexing unit 1120.

The multiplexing unit 1120 reconfigures the unit digital signals based on the values output from the majority circuit 1115, and outputs the reconfigured unit digital signals to the payload generation unit 1124.

The registers 1116 to 1118, the majority circuit 1119, and the multiplexing unit 1121, as the registers 1112 to 1114, the majority circuit 1115, and the multiplexing unit 1120, reconfigure the unit digital signals, and output the reconfigured unit digital signals to the payload generation unit 1124.

The payload generation unit 1124 generates, from the unit digital signals output from the multiplexing unit 1120 and the multiplexing unit 1121, a payload portion of a digital signal to be output to the CPU 1100 (hereinafter, referred to as output digital signal).

The area determination unit 1123 acquires, based on the unit digital signals output from the multiplexing unit 1120 and the multiplexing unit 1121, an area in which the touch positions exist. In other words, the area determination unit 1123 determines which of the icon area, the picture-drawing area, and the keyboard area the user touches, and acquires area information indicating the touched area.

Moreover, the CPU 1100 stores the content specified by the color/non-color specification icon and the content specified by the color selection icon in the register 1127.

The header generation unit 1125, based on the area information acquired by the area determination unit 1123 and the contents stored in the register 1127, generates a header portion of the output digital signal to be output to the CPU 1100.

FIG. 5 is a diagram showing an example of the output digital signal generated by the header generation unit 1125 and the payload generation unit 1124. As shown in FIG. 5, the output digital signal is constituted by the header portion and the payload portion. The header portion contains the content specified by the color/non-color specification icon and the area information. Moreover, when content specified by the color/non-color specification icon is to use the colors, the header portion also contains the content specified by the color selection icon. The payload portion contains the unit digital signal in the X-axis direction and the unit digital signal in the Y-axis direction.

The output digital signal thus generated is output to the register latch 1128. The register latch 1128 stores the output digital signal thus input.

The sequencer 1126 acquires the area information from the header portion of the output digital signal. Then, according to the area information, the sequencer 1126 converts the output digital signal. Specifically, the sequencer 1126 discards parts of the payload portion of the output digital signal stored in the register latch 1128. More specifically, only when the area information indicates the picture-drawing area, the sequencer 1126 discards parts of the payload portion of the output digital signal stored in the register latch 1128.

Still more specifically, the unit digital signal indicates, in a portion thereof (more specifically, upper eight bits), the coordinate of a touch position in a resolution lower than the predetermined resolution. The sequencer 1126, for the respective unit digital signals contained in the output digital signal, by discarding remainder (lower two bits) other than the portion (upper eight bits), stores again unit digital signals constituted only by the portion (upper eight bits) in the payload portion of the output digital signal.

FIG. 6 is a diagram showing an example of the digital signal after the conversion carried out in this way. As shown in FIG. 6, the payload portion of the converted digital signal is constituted by the unit digital signals of eight bits.

The CPU 1100 acquires the digital signal stored in the register latch 1128, and acquires, based on the digital signal, the coordinate information indicating the touch position on the input surface. Moreover, the CPU 1100, based on the area information contained in the header portion of the digital signal, carries out either the rendering process or a process relating to the icon.

As described above, the touch panel control unit 1106 reduces the bit length of the payload portion of the output digital signal, and thus it is possible to restrict the decrease in processing speed due to the increase in bit length of the output digital signal.

Moreover, it is possible, by the simple processing of obtaining the part of the plurality of bits constituting the payload portion, to convert the output digital signal.

Further, in the touch panel control unit 1106, depending on whether the touch position is in the area in which the processing speed is emphasized more than the precision of the touch position (picture-drawing area), the CPU 1100 can obtain the user-specified position based on either the output digital signal before the conversion or the output digital signal after the conversion, and thus it is possible, according to necessity, to restrict the decrease in processing speed due to the increase in bit length of the output digital signal.

It should be noted that the present invention is not limited to the embodiment described above. For example, the description is given of the example in which the present invention is applied to the mobile telephone in the embodiment described above, but the present invention may be widely applied to touch panel control devices.

Moreover, the majority circuit 1115 uses the unit digital signals for three times in order to determine the majority in the embodiment described above, but the number of times is not limit to three, and the unit digital signals for any number (preferably, odd number) of times may be used for determining the majority.

Second Embodiment

Figure 7:
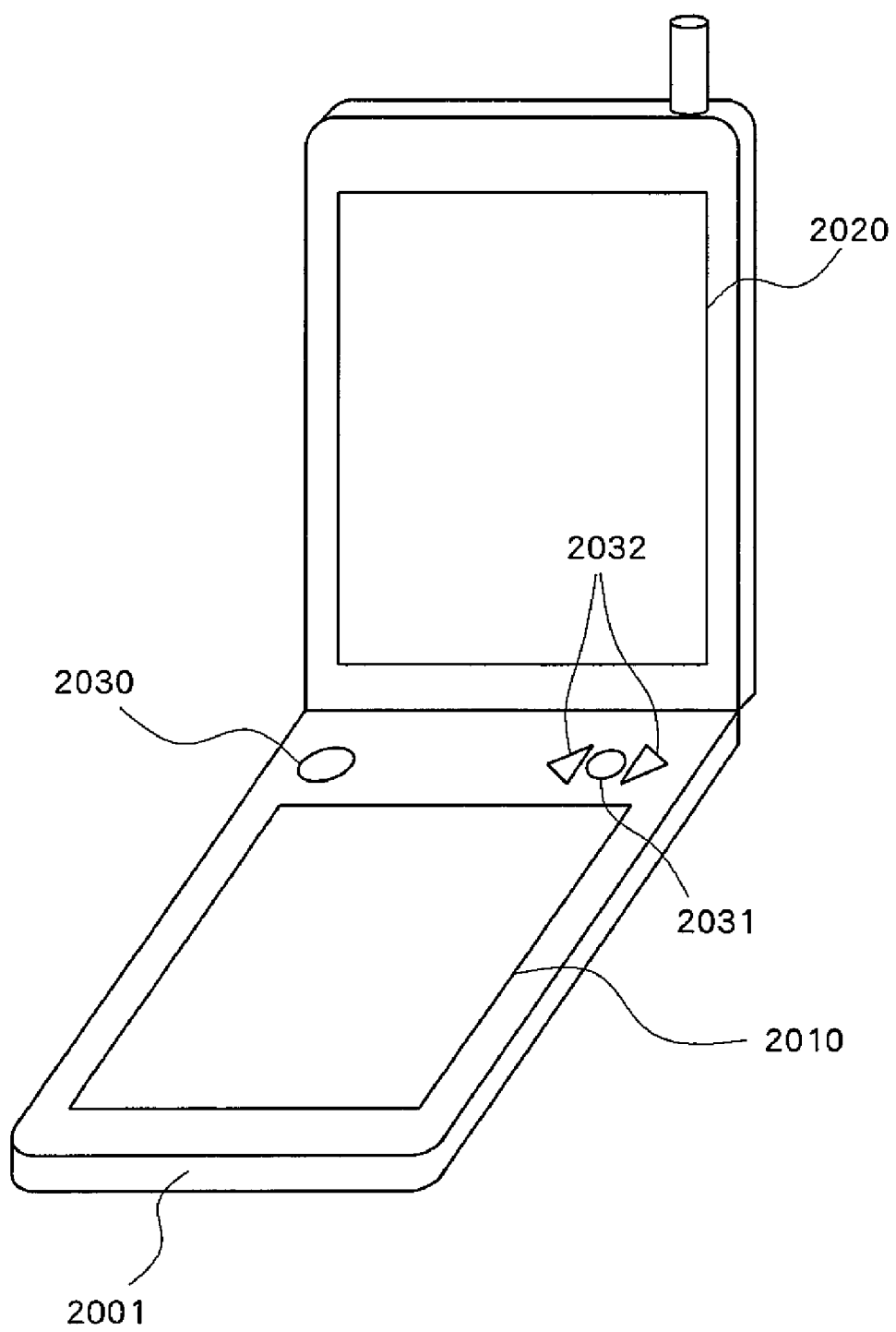
FIG. 7 is a diagram showing an exterior of a mobile telephone according to a second embodiment of the present invention.

FIG. 7 is a diagram showing an exterior of a mobile telephone 2001 according to a second embodiment of the present invention. The mobile telephone 2001 is a flip type mobile telephone functioning as a display function-equipped coordinate input device, and includes a touch screen 2010, a liquid crystal display (LCD) 2020, a power button 2030, a select button 2031, and a scroll button 2032.

Moreover, FIG. 8 is a diagram showing a system configuration of the mobile telephone 2001. As shown in FIG. 8, the mobile telephone 2001 includes a CPU 2100, a memory 2101, an audio I/O unit 2102, a baseband processing unit 2103, an LCD control unit 2104, a memory 2105, a touch panel control unit 2106, a memory 2107, the touch screen 2010, and the LCD 2020.

The CPU 2100 carries out processing relating to control of respective components and communications of the mobile telephone 2001. The memory 2101 stores various types of data used in the processing carried out by the CPU 2100.

The audio I/O unit 2102 is provided with a microphone and a loudspeaker, collects audio generated by a user, outputs the audio as an electric signal to the CPU 2100, converts an electric signal input from the CPU 2100 into audio, and outputs the audio.

The baseband processing unit 2103 receives a radio signal from a base station device (not shown), converts the received radio signal into a signal at a predetermined frequency (baseband frequency), and outputs the signal to the CPU 2100. Moreover, the baseband processing unit 2103 converts a signal input from the CPU 2100 into a radio signal, and transmits the converted signal to the base station device.

The touch screen 2010 is provided with a touch panel 2300 functioning as an input surface of a coordinate input device, and further, the input surface functions as the LCD 2301 which is a display device. When the user touches the input surface, the touch panel 2300 acquires coordinate information indicating the coordinate of the touch position, and outputs the coordinate information to the touch panel control unit 2106. The LCD 2301 displays information according to instructions of the LCD control unit 2104.

The LCD 2020 is also a display device for displaying information according to the instructions of the LCD control unit 2104. As described above, the touch screen 2010 is also provided with the display device, and thus, the mobile telephone 2001 is provided with two display devices.

The LCD 2301 and the LCD 2020 are provided with a light-emitting diode (LED) 2302 and an LED 2200, respectively. Both the LED 2302 and the LED 2200 function as backlights. The LED 2302 also functions as illumination means for illuminating the input surface of the touch panel 2300.

The touch panel control unit 2106 controls the touch panel 2300. Specifically, the touch panel control unit 2106 outputs the coordinate information input from the touch panel 2300 to the CPU 2100. The memory 2107 stores various types of data used in the processing carried out by the touch panel control unit 2106.

Figure 11:
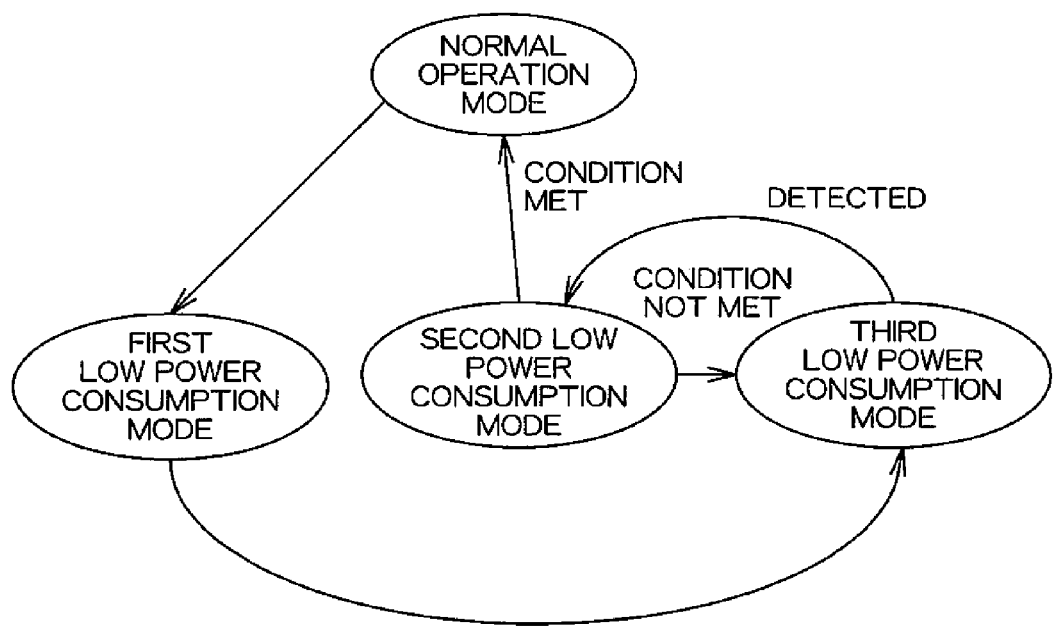
FIG. 11 is a transition diagram showing transitions among modes of the mobile telephone according to the second embodiment of the present invention.

The mobile telephone 2001 operates in any one of a normal operation mode in which all the LCD 2020, the LED 2200, the LCD 2301, and the LED 2302 are turned on/make a display, a first low power consumption mode in which the LCD 2020 and the LCD 2301 make a display, and the LED 2200 and the LED 2302 are turned off, a second low power consumption mode in which the LCD 2020, the LED 2200, and the LCD 2301 are turned off/do not make a display, and the LED 2302 is turned on, and a third low power consumption mode in which all the LCD 2020, the LED 2200, the LCD 2301, and the LED 2302 are turned off/do not make a display. The touch panel control unit 2106, by switching among those modes, enables one of the modes. FIG. 11 is a transition diagram showing transitions among those modes. A process for them is described later.

The LCD control unit 2104 controls the LCD 2301 and the LCD 2020. Specifically, the LCD control unit 2104 causes the LCD 2020 or the LCD 2301 to display information input from the CPU 2100. The memory 2105 stores various types of data used for the processing carried out by the LCD control unit 2104.

A description is now given of functions relating to operations of the mobile telephone 2001 carried out by a user.

The power button 2030, the select button 2031 and the scroll button 2032 are operation means provided for the mobile telephone 2001 as hardware. On the other hand, the touch screen 2010 realizes operation means based on software. A detailed description is now given of those means.

The power button 2030 is a push button used to turn on/off a power supply of the mobile telephone 2001. By the user depressing the power button 2030, the power supply of the mobile telephone 2001 is switched between on and off.

The select button 2031 and the scroll button 2032 are used when the user selects an object (such as icon and link) displayed on the LCD 2020. In other words, the user highlights any one of one or more objects displayed on the LCD 2020 by means of the scroll button 2032. When the user depresses the select button 2031 while a certain object is being highlighted, the CPU 2100 starts processing associated with this object.

A description is next given of operation means realized by the touch screen 2010. FIG. 9 is a diagram showing an initial state of the screen (initial screen) displayed on the LCD 2301, namely, an input surface of the touch panel 2300. As shown in FIG. 9, in the initial state, respective icons of "Picture-draw", "Call", "Answer", "E-MAIL", "0" to "9", "*", and "#" are displayed on the LCD 2301.

When the user touches the "Call" icon, the CPU 2100 acquires coordinate information indicating the coordinate at which the "Call" icon is displayed. Based on the fact that this coordinate information has been acquired, the CPU 2100 detects that the "Call" icon has been touched, and starts a calling process.

On this occasion, the user specifies a phone number of the calling destination or the like by touching the respective icons of "0" to "9", "*", or "#". Also on this occasion, the CPU 2100 acquires coordinate information indicating the coordinates at which icons touched by the user are displayed. Based on the fact that this coordinate information has been acquired, the CPU 2100 detects that the respective icons of "0" to "9", "*", or "#" have been touched.

When the user touches the "Answer" icon, the CPU 2100 acquires coordinate information indicating the coordinate at which the "Answer" icon is displayed. Based on the fact that this coordinate information has been acquired, the CPU 2100 detects that the "Answer" icon has been touched. When the CPU 2100 detects that the "Answer" icon is touched while there is an incoming call, the CPU 2100 starts an answering process.

When the user touches the "E-MAIL" icon, the CPU 2100 acquires coordinate information indicating the coordinate at which the "E-MAIL" icon is displayed. Based on the fact that this coordinate information has been acquired, the CPU 2100 detects that the "E-MAIL" icon has been touched, and starts a predetermined process relating to the electronic mail.

When the user touches the "Picture-draw" icon, the CPU 2100 acquires coordinate information indicating the coordinate at which the "Picture-draw" icon is displayed. Based on the fact that this coordinate information has been acquired, the CPU 2100 detects that the "Picture-draw" icon has been touched, and transitions the screen displayed on the LCD 2301 from the initial state to an "Character-inputting/Picture-drawing" screen.

Figure 10:
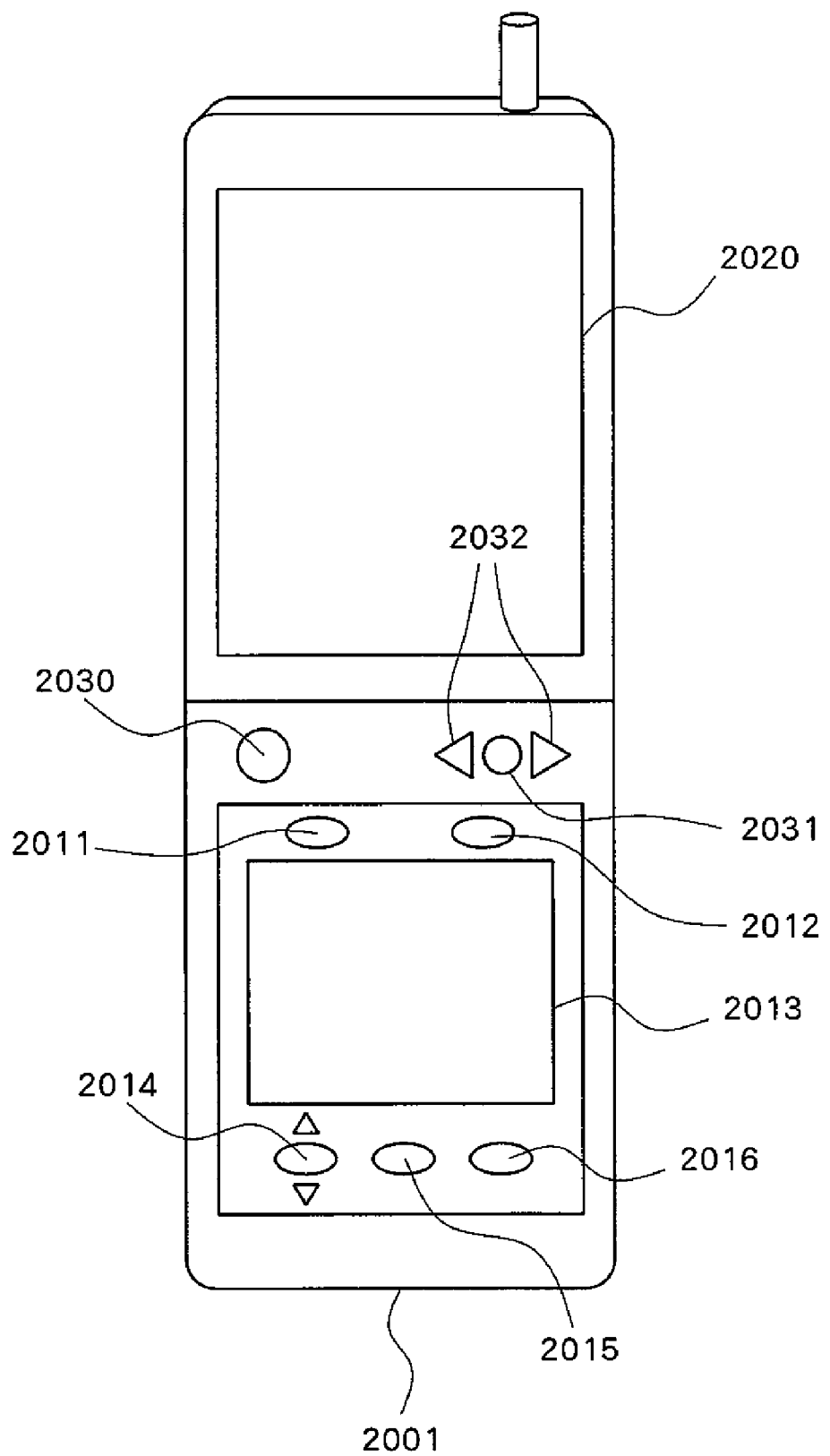
FIG. 10 is a diagram showing an exterior of the mobile telephone in a state displaying an "Character-inputting/Picture-drawing" screen on the touch screen according to the second embodiment of the present invention.

FIG. 10 is a diagram showing an exterior of the mobile telephone 2001 in a state in which the "Character-inputting/Picture-drawing" screen is displayed on the LCD 2301. As shown in FIG. 10, on the "Character-inputting/Picture-drawing" screen, a calling icon 2011, an answering icon 2012, a picture-drawing area 2013, a line width selection icon 2014, an eraser icon 2015, and a color selection icon 2016 are displayed on the LCD 2301.

Processes carried out by the CPU 2100 when the user touches the calling icon 2011 and the answering icon 2012 are the same as the processes carried out when the user, on the initial screen, touches the "Call" icon and the "Answer" icon.

The picture-drawing area 2013 is constituted by a plurality of dots. The user successively moves the touch position, thereby inputting characters and pictures according to trajectories thereof. On this occasion, the CPU 2100 successively acquires the coordinate information according to the respective touch positions, and based on the coordinate information, acquires dots touched by the user among the respective dots constituting the picture-drawing area 2013.

The user selects, by means of the line width selection icon 2014, the thickness of a line used for writing a character or drawing a picture in the drawing area 2013. The CPU 2100, according to the width of the line selected by the user, acquires dots based on the coordinate information.

The memory 2101 associates the respective dots constituting the picture-drawing area 2013 and color information (information indicating in which color of black, white, red, yellow, blue, transparent, and the like the dots are drawn) with each other, and stores the dots and the color information. The user specifies the color by means of the color selection icon 2016. The CPU 2100 associates the dots acquired as described above and the color specified by the color selection icon 2016 selected when the dots are acquired with each other, and stores the dots and the color in the memory 2101.

It should be noted that the user can also specify an eraser mode by means of the eraser icon 2015. While the eraser mode is specified, the CPU 2100 associates the dots acquired as described above and the transparent color with each other, and stores the dots and the transparent color in the memory 2101.

A detailed description is next given of a process carried out by the touch panel control unit 2106. It should be noted that the description is given respectively of a case in which the touch panel 2300 is an analog resistive touch panel, and a case in which the touch panel 2300 is a digital touch panel.

Figure 12:
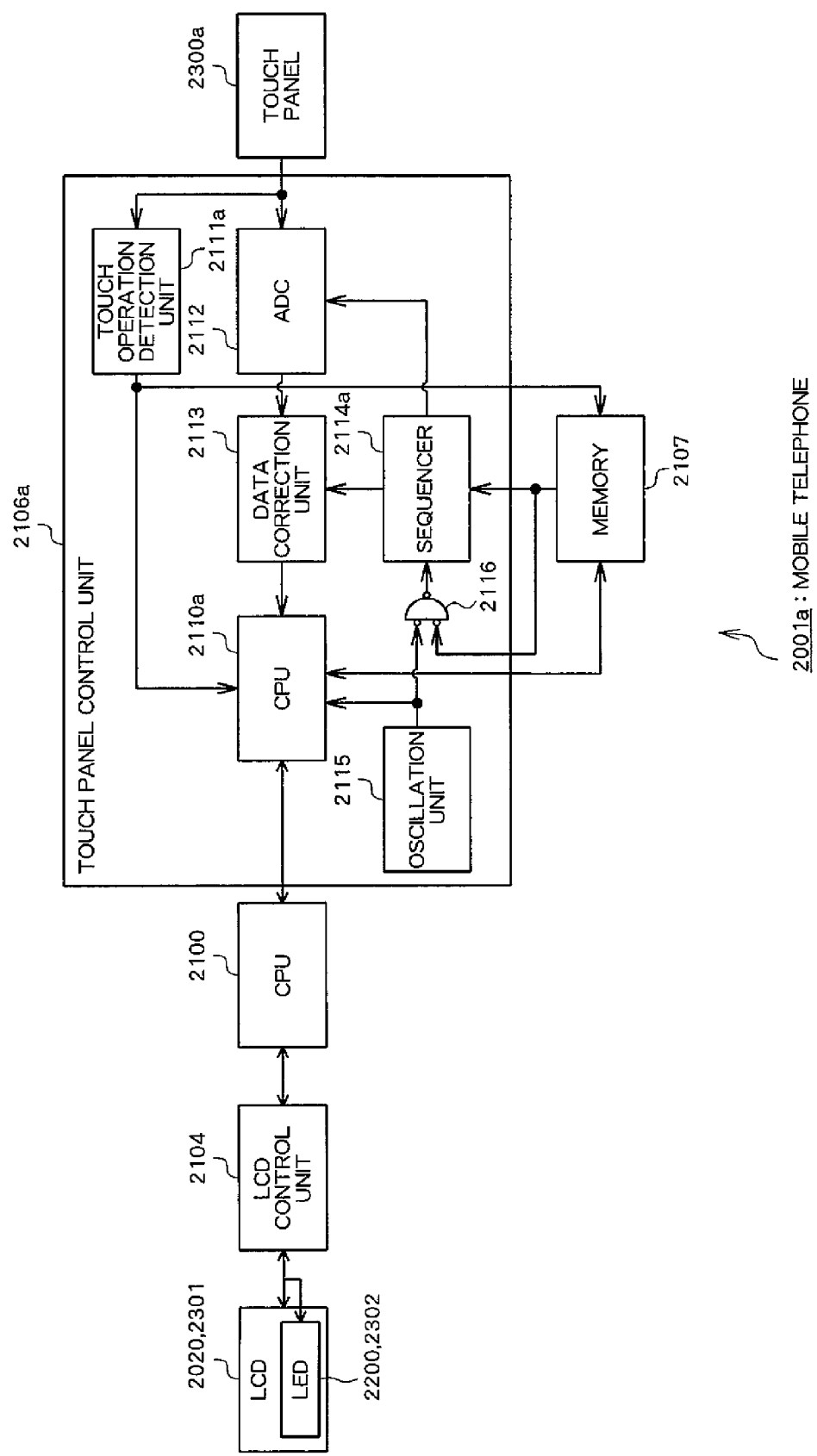
FIG. 12 is a diagram showing a functional block of a touch panel control unit contained in a mobile telephone equipped with an analog resistive touch panel according to the second embodiment of the present invention.

FIG. 12 is a diagram showing functional block of a touch panel control unit 2106a included in a mobile telephone 2001a equipped with an analog resistive touch panel 2300a.

As shown in FIG. 12, the touch panel control unit 2106a includes a CPU 2110a, a touch operation detection unit 2111a, an analog-to-digital converter (ADC, AD converter) 2112, a data correction unit 2113, a sequencer 2114a, an oscillation unit 2115, and a logic circuit 2116.

The touch panel 2300a acquires a resistance value corresponding to a position on the input surface touched by the user, and outputs the resistance value to the ADC 2112.

The ADC 2112 converts the resistance value input from the touch panel 2300a into a digital signal, and inputs the digital signal into the data correction unit 2113.

The data correction unit 2113 corrects a read error possibly occurring to the digital signal input from the ADC 2112 by means of predetermined correction processing. Then, the data correction unit 2113 inputs the corrected digital signal into the CPU 2110a.

The CPU 2110a outputs the input digital signal to the CPU 2100.

The touch operation detection unit 2111a monitors an input of the resistance value from the touch panel 2300a, and detects, when the input occurs, a touch operation carried out by the user on the input surface (user-specified operation). The touch operation detection unit 2111a, upon detecting the touch operation, inputs touch operation detection information indicating the detected touch operation to the CPU 2110a, and also sets a processing enable bit stored in a control register in the memory 2107 to zero. The processing enable bit is one-bit information indicating whether processing for the resistance value input from the touch panel 2300a is to be carried out. The control register in the memory 2107 is a register used to operate the sequencer 2114a.

The sequencer 2114a monitors the processing enable bit, and, when the processing enable bit is zero, causes the ADC 2112 and the data correction unit 2113 to carry out the processing. On the other hand, when the processing enable bit is one, the sequencer 2114a causes the ADC 2112 and the data correction unit 2113 to stop the processing.

The oscillation unit 2115 oscillates the clock signal at a predetermined cycle. The CPU 2110a and the sequencer 2114a, when this clock signal is input, operate in synchronism with the clock signal.

The logic circuit 2116, when the processing enable bit is zero, inputs the clock signal into the sequencer 2114a, and, when the processing enable bit is one, does not input the clock signal into the sequencer 2114a. As a result, the sequencer 2114a stops the processing when the processing enable bit is one.

The CPU 2110a, by switching the respective modes of the mobile telephone 2001a, enables any mode. Referring to FIG. 11 and FIG. 12, a specific description is now given.

The CPU 2110a, depending on whether or not the touch operation detection information is input, causes the LCD control unit 2104 to control the LCD 2020, the LED 2200, the LCD 2301, and the LED 2302 via the CPU 2100, thereby switching the respective modes.

Specifically, when the normal operation mode is effective, and the touch operation detection information has not been input for a predetermined period of time, the CPU 2110a causes the LCD control unit 2104 to turn off the LED 2200 and the LED 2302, thereby activating the first low power consumption mode.

Moreover, when the first low power consumption mode is effective, and the touch operation detection information has not been input for a predetermined period of time or more, the CPU 2110a causes the LCD control unit 2104 to turn off the LCD 2020 and the LCD 2301, thereby activating the third low power consumption mode.

On the other hand, when the third low power consumption mode is effective, and the touch operation detection information is input, the CPU 2110a causes the LCD control unit 2104 to turn on the LED 2302, thereby activating the second low power consumption mode.

In the second low power consumption mode, when the touch operation detection information is further input, the CPU 2110a acquires the coordinate of a position on the input surface specified by the touch operation detected by the touch operation detection unit 2111a. Then, the CPU 2110a determines whether the acquired one or more coordinates meet a predetermined condition, and restricts the operations of the LCD 2020 and the LCD 2301 based on a result of the determination. In other words, based on the determination result, the CPU 2110a activates either the normal operation mode or the third low power consumption mode.

More specifically, the memory 2107 stores pattern image information indicating pattern images such as "○", "×", "Δ", "☆", "〒", "卍", "#", and "open sesame". The CPU 2110a carries out predetermined pattern recognition processing for the acquired one or more coordinates, and determines whether the one or more coordinates constitute one of the pattern images stored in the memory 2107. Then, when the CPU 2110*a* determines that the one or more coordinates constitute one of the pattern images, the CPU 2110*a* causes the LCD control unit 2104 to activate the LCD 2020 and the LCD 2301, and turns on the LED 2200, thereby activating the normal operation mode. On the other hand, when the CPU 2110*a* determines that the one or more coordinates do not constitute one of the pattern images, the CPU 2110*a* activates the third low power consumption mode.

Further, when the touch operation detection information has not been input for a predetermined period of time or more, the CPU 2110*a* sets the processing enable bit stored in the memory 2107 to 1. As a result, the processing carried out by the ADC 2112 and the data correction unit 2113 is stopped.

Figure 13:
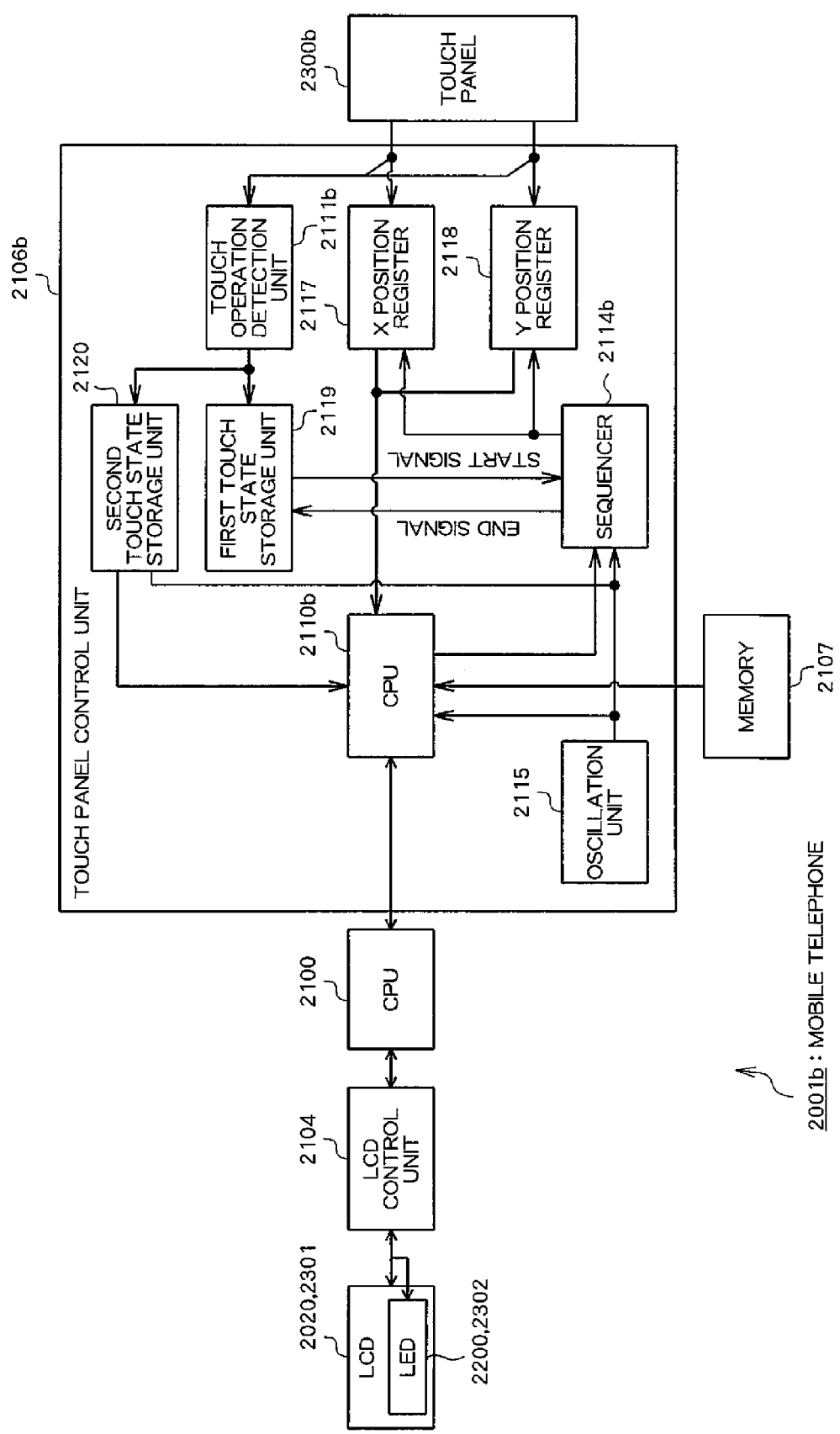
FIG. 13 is a diagram showing a functional block of a touch panel control unit included in a mobile telephone equipped with a digital touch panel according to the second embodiment of the present invention.

FIG. 13 is a diagram showing a functional block of a touch panel control unit 2106*b* included in a mobile telephone 2001*b* equipped with a digital touch panel 2300*b*.

As shown in FIG. 13, the touch panel control unit 2106*b* includes a CPU 2110*b*, a touch operation detection unit 2111*b*, a sequencer 2114*b*, the oscillation unit 2115, an X position register 2117, a Y position register 2118, a first touch state storage unit 2119, and a second touch state storage unit 2120.

The touch panel 2300*b* acquires the coordinate of a position on an input surface touched by the user, and outputs a digital signal indicating the X coordinate thereof to the X position register 2117, and a digital signal indicating the Y coordinate thereof to the Y position register 2118, respectively.

Both the X position register 2117 and the Y position register 2118 are storage means of first-in/first-out type, and store digital signals input from the touch panel 2300*b*.

The CPU 2110*b* reads the digital signals stored in the X position register 2117 and the Y position register 2118, and outputs the digital signals to the CPU 2100.

The touch operation detection unit 2111*b* monitors an input of the digital signals from the touch panel 2300*b*, and detects, when the input occurs, a touch operation carried out by the user on the input surface (user-specified operation). When the touch operation detection unit 2111*b* detects the touch operation, the touch operation detection unit 2111*b* stores the touch operation detection information indicating the detected touch operation in the first touch state storage unit 2119 and the second touch state storage unit 2120.

Both the first touch state storage unit 2119 and the second touch state storage unit 2120 are formed by a flip-flop circuit, and store the touch operation detection information input from the touch operation detection unit 2111*b*. The first touch state storage unit 2119 stores the touch operation detection information until the stored information is reset by the sequencer 2114*b*. On the other hand, the second touch state storage unit 2120 stores the touch operation detection information for one cycle of a clock signal described later.

The sequencer 2114*b* monitors the first touch state storage unit 2119, and, when the first touch state storage unit 2119 holds the touch operation detection information, causes the X position register 2117 and the Y position register 2118 to store the digital signals. On the other hand, when the first touch state storage unit 2119 does not hold the touch operation detection information, the sequencer 2114*b* does not cause the X position register 2117 and the Y position register 2118 to store the digital signals.

The oscillation unit 2115 oscillates the clock signal at a predetermined cycle. The CPU 2110*b* and the sequencer 2114*b* operate in synchronism with the clock signal when this clock signal is input.

The CPU 2110*b*, by switching the respective modes of the mobile telephone 2001*b*, enables any mode. Referring to FIG. 11 and FIG. 13, a specific description is now given.

The CPU 2110*b* monitors the second touch state storage unit 2120, and, depending on whether or not the touch operation detection information is held, causes the LCD control unit 2104 to control the LCD 2020, the LED 2200, the LCD 2301, and the LED 2302 via the CPU 2100, thereby switching the respective modes.

Specifically, when the normal operation mode is effective, and the state in which the touch operation detection information is not held has continued for a predetermined period of time or more, the CPU 2110*b* causes the LCD control unit 2104 to turn off the LED 2200 and the LED 2302, and activates the first low power consumption mode.

Moreover, when the first low power consumption mode is effective, and the state in which the touch operation detection information is not held has continued for a predetermined period of time or more, the CPU 2110*b* causes the LCD control unit 2104 to turn off the LCD 2020 and the LCD 2301, thereby activating the third low power consumption mode.

On the other hand, when the third low power consumption mode is effective, and the touch operation detection information is held, the CPU 2110*b* causes the LCD control unit 2104 to turn on the LED 2302, thereby activating the second low power consumption mode.

In the second low power consumption mode, when the touch operation detection information is held, the CPU 2110*b* acquires the coordinate of a position on the input surface specified by the touch operation detected by the touch operation detection unit 2111*b*. Then, the CPU 2110*b* determines whether the acquired one or more coordinates meet a predetermined condition, and restricts the operations of the LCD 2020 and the LCD 2301 based on a result of the determination. In other words, based on the determination result, the CPU 2110*a* activates either the normal operation mode or the third low power consumption mode.

More specifically, the memory 2107 stores pattern image information indicating pattern images such as "○", "×", "Δ", "☆", "テ", "卍", "#", and "open sesame". The CPU 2110*b* carries out predetermined pattern recognition processing for the acquired one or more coordinates, and determines whether the one or more coordinates constitute one of the pattern images stored in the memory 2107. Then, when the CPU 2110*a* determines that the one or more coordinates constitute one of the pattern images, the CPU 2110*a* causes the LCD control unit 2104 to activate the LCD 2020 and the LCD 2301, and turns on the LED 2200, thereby activating the normal operation mode. On the other hand, when the CPU 2110*a* determines that the one or more coordinates do not constitute one of the pattern images, the CPU 2110*a* activates the third low power consumption mode.

Further, when the touch operation detection information has not been stored in the second touch state storage unit 2120 for a predetermined period of time or more, the CPU 2110*b* stops the processing by the sequencer 2114*b*. When the processing is stopped in this way, the sequencer 2114*b* resets the information stored in the first touch state storage unit 2119.

As described above, according to the mobile telephone 2001, since it is possible to restrict the operations of the LCD 2020 and the LCD 2301 depending on whether or not the coordinates meet the predetermined condition, and hence it is possible to restrict the transition to the normal operation mode due to an inadvertent touch to the input surface by the user.

Moreover, the CPU 2110 can restrict the operations of the LCD 2020 and the LCD 2301 based on whether or not coordinates constitute a pattern image.

Further, since it is possible to cause the LED 2302 to illuminate the input surface (second low power consumption mode) while the user is carrying out the touch operation, it is possible to prevent the user from carrying out an operation by mistake, such as specifying a position outside the input surface while the user wants to specify a position on the input surface.

It should be noted that the present invention is not limited to the above-mentioned embodiment. For example, in the embodiment, the description is given of the flip type mobile telephone, which functions as the display function-equipped coordinate input device, but the present invention may be applied to any other devices such as a personal digital assistant (PDA) as long as a device functions as the display function-equipped coordinate input device.

Third Embodiment

Figure 14:
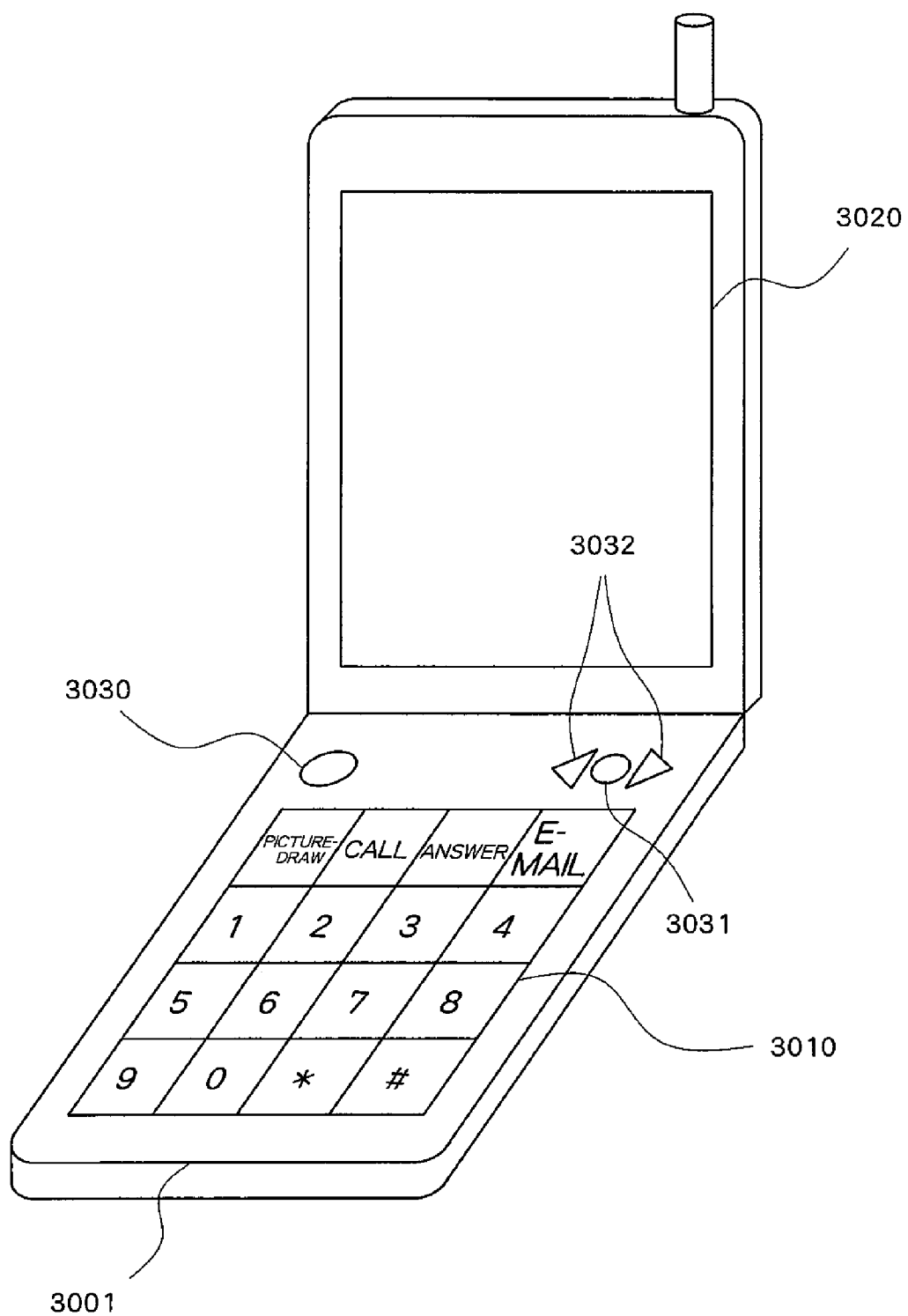
FIG. 14 is a diagram showing an exterior of a mobile telephone according to a third embodiment of the present invention.

FIG. 14 is a diagram showing an exterior of a mobile telephone 3001 according to a third embodiment of the present invention. The mobile telephone 3001 is a flip type mobile telephone functioning as a touch position acquisition device, and includes a touch screen 3010, a liquid crystal display (LCD) 3020, a power button 3030, a select button 3031, and a scroll button 3032.

Figure 15:
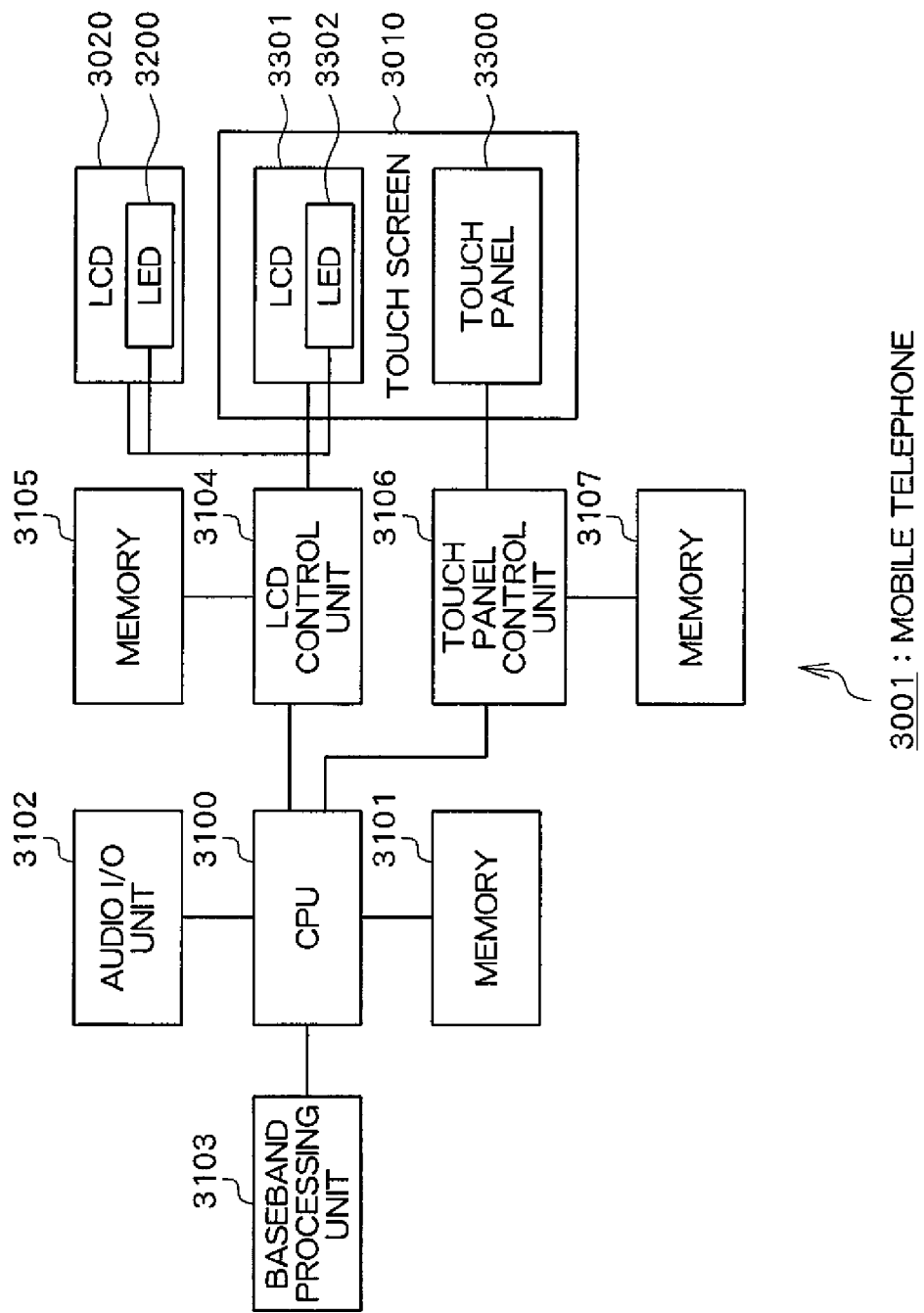
FIG. 15 is a diagram showing a system configuration of the mobile telephone according to the third embodiment of the present invention.

Moreover, FIG. 15 is a diagram showing a system configuration of the mobile telephone 3001. As shown in the drawing, the mobile telephone 3001 includes a CPU 3100, a memory 3101, an audio I/O unit 3102, a baseband processing unit 3103, an LCD control unit 3104, a memory 3105, a touch panel control unit 3106, a memory 3107, the touch screen 3010, and the LCD 3020.

The CPU 3100 carries out processing relating to control of respective components and communications of the mobile telephone 3001. The memory 3101 stores various types of data used for the processing carried out by the CPU 3100.

The audio I/O unit 3102 is provided with a microphone and a loudspeaker, collects audio generated by a user, outputs the audio as an electric signal to the CPU 3100, converts the electric signal input from the CPU 3100 into audio, and outputs the audio.

The baseband processing unit 3103 receives a radio signal from a base station device (not shown), converts the received radio signal into a signal at a predetermined frequency (baseband frequency), and outputs the signal to the CPU 3100. Moreover, the baseband processing unit 3103 converts a signal input from the CPU 3100 into a radio signal, and transmits the converted signal to the base station device.

The touch screen 3010 is provided with an analog resistive touch panel 3300, and further, the input surface functions as an LCD 3301, which is a display device. When the user touches the input surface, the touch panel 3300 outputs a voltage corresponding to the touch position to the touch panel control unit 3106. The LCD 3301 displays information according to instructions of the LCD control unit 3104.

Figure 20:
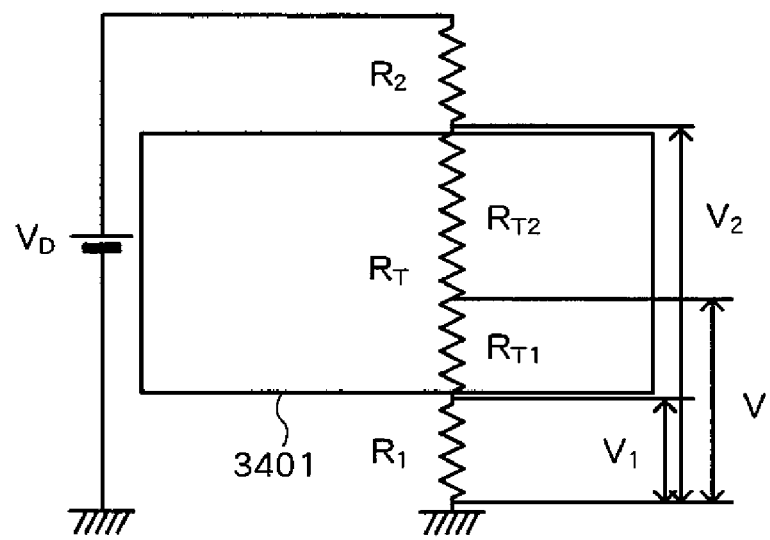
FIG. 20 is a diagram showing an equivalent circuit of an analog resistive touch panel in which wiring has electric resistances.

An equivalent circuit of the touch panel 3300 is similar to a touch panel 3401 shown in FIG. 20. In other words, the touch panel 3300 is provided with a resistive film (resistance $R_T$) from one end to the other end, and a DC voltage $V_D$ is applied on the resistive film $R_T$. The touch panel 3300, when a touch surface is touched, outputs a voltage V applied on a touch position to the touch panel control unit 3106. Moreover, the touch panel 3300 also outputs voltages applied on both ends of the resistive film (voltage $V_1$ and voltage $V_2$) to the touch panel control unit 3106.

The LCD 3020 is also a display device for displaying information according to the instructions of the LCD control unit 3104. As described above, the touch screen 3010 is also provided with the display device, and thus, the mobile telephone 3001 is provided with two display devices.

The LCD 3301 and the LCD 3020 are respectively provided with a light-emitting diode (LED) 3302 and an LED 3200. Both the LED 3302 and the LED 3200 function as backlights.

The touch panel control unit 3106 controls the touch panel 3300. Moreover, when the touch panel control unit 3106 detects a touch operation, the touch panel control unit 3106 calculates, according to the voltage V input from the touch panel 3300, a resistance $R_{T1}$ from a ground point to the touch position (resistance dividing point). Moreover, the voltage $V_1$ and the voltage $V_2$ are acquired. Then, the touch panel control unit 3106 calculates, based on the resistance $R_T$, the resistance $R_{T1}$ thus acquired, the voltage $V_1$, and the voltage $V_2$, the touch position (coordinate information), and outputs the touch position to the memory 3107. The CPU 3100 acquires the touch position from the memory 3107 via the touch panel control unit 3106, and carries out processing according to the touch position. A detailed description is later given of the processing carried out by the touch panel control unit 3106.

The memory 3107 stores the touch position acquired by the touch panel control unit 3106.

The LCD control unit 3104 controls the LCD 3301 and the LCD 3020. Specifically, the LCD control unit 3104 causes the LCD 3020 or the LCD 3301 to display information input from the CPU 3100. The memory 3105 stores various types of data used for the processing carried out by the LCD control unit 3104.

A description is now given of functions relating to operations of the mobile telephone 3001 carried out by a user.

The power button 3030, the select button 3031, and the scroll button 3032 are operation means provided to the mobile telephone 3001 as hardware. On the other hand, the touch screen 3010 realizes operation means based on software. A detailed description is now given of respective operation means.

The power button 3030 is a push button used to turn on/off a power supply of the mobile telephone 3001. By the user depressing the power button 3030, the power supply of the mobile telephone 3001 is switched between on and off.

The select button 3031 and the scroll button 3032 are used when the user selects an object (such as icon and link) displayed on the LCD 3020. In other words, the user highlights any one of one or a plurality of objects displayed on the LCD 3020 by means of the scroll button 3032. When the user depresses the select button 3031 while a certain object is being highlighted, the CPU 3100 starts processing associated with this object.

A description is next given of the operation means realized by the touch screen 3010. FIG. 14 shows an initial state of the screen displayed on the LCD 3301, namely, an input surface of the touch panel 3300. As shown in the drawing, in the initial state, respective icons of "Picture-draw", "Call", "Answer", "E-MAIL", "0" to "9", "*" and "#" are displayed on the LCD 3301.

When the user touches the "Call" icon, the CPU 3100 acquires coordinate information indicating the coordinate at which the "Call" icon is displayed. Based on the fact that this coordinate information has been acquired, the CPU 3100 detects that the "Call" icon has been touched, and starts a calling process.

On this occasion, the user specifies a phone number of the calling destination or the like by touching the respective icons of "0" to "9", "*", and "#". Also on this occasion, the CPU 3100 acquires coordinate information indicating the coordinates at which icons touched by the user are displayed. Based on the fact that this coordinate information has been acquired, the CPU 3100 detects that the respective icons of "0" to "9", "*" and "#" have been touched.

When the user touches the "Answer" icon, the CPU 3100 acquires coordinate information indicating the coordinate at which the "Answer" icon is displayed. Based on the fact that this coordinate information has been acquired, the CPU 3100 detects that the "Answer" icon has been touched. When the CPU 3100 detects that the "Answer" icon is touched while there is an incoming call, the CPU 3100 starts an answering process.

When the user touches the "E-MAIL" icon, the CPU 3100 acquires coordinate information indicating the coordinate at which the "E-MAIL" icon is displayed. Based on the fact that this coordinate information has been acquired, the CPU 3100 detects that the "E-MAIL" icon has been touched, and starts a predetermined process relating to the electronic mail.

When the user touches the "Picture-draw" icon, the CPU 3100 acquires coordinate information indicating the coordinate at which the "Picture-draw" icon is displayed. Based on the fact that this coordinate information has been acquired, the CPU 3100 detects that the "Picture-draw" icon has been touched, and causes the screen displayed on the LCD 3301 to transition from the initial state to an "Character-inputting/Picture-drawing" screen (not shown).

The "Character-inputting/Picture-drawing" screen is provided with a picture-drawing area constituted by a plurality of dots. The user successively moves the touch position, thereby inputting characters and pictures according to trajectories thereof. On this occasion, the CPU 3100 successively acquires the coordinate information according to the respective touch positions, and, based on the coordinate information, recognizes dots touched by the user among the respective dots constructing the picture-drawing area.

The memory 3101 associates the respective dots constituting the picture-drawing area and color information (information indicating which color of black, white, red, yellow, blue, transparent, and the like the dots are drawn in) with each other, and stores the dots and the color information. The CPU 3100 associates the dots acquired as described above and the color specified by the user when the dots are acquired with each other, and stores the dots and the color in the memory 3101.

A detailed description is next given of a process carried out by the touch panel control unit 3106.

Figure 16:
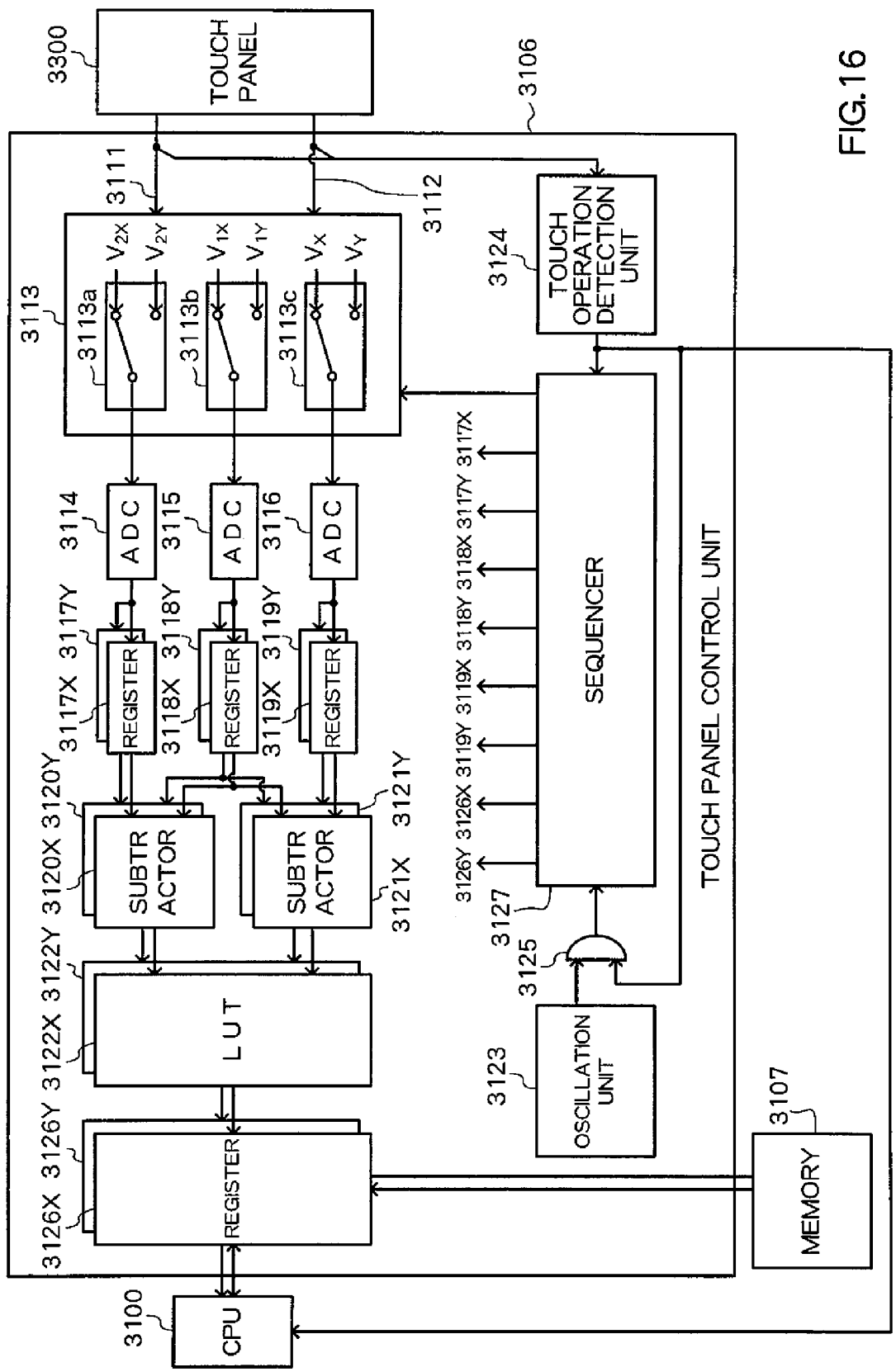
FIG. 16 is a diagram showing a functional block of a touch panel control unit according to the third embodiment of the present invention.

FIG. 16 is a diagram showing a functional block of the touch panel control unit 3106. As shown in the drawing, the touch panel control unit 3106 includes a voltage measurement line for X-axis position detection 3111, a voltage measurement line for Y-axis position detection 3112, an analog switch 3113, analog-to-digital converters (ADCs, AD converters) 3114 to 3116, registers 3117X and 3117Y to 3119X and 3119Y, subtractors 3120X and 3120Y and 3121X and 3121Y, look-up tables (LUTs) 3122X and 3122Y, an oscillation unit 3123, a touch operation detection unit 3124, a logic circuit 3125, registers 3126X and 3126Y, and a sequencer 3127.

The touch panel 3300 has the rectangular input surface, and, in the following description, a direction along one side thereof is referred to as X-axis direction, and a direction orthogonal to the X-axis direction is referred to as Y axis. The touch panel 3300, respectively for the X-axis direction and the Y-axis direction, outputs and acquires the voltage V corresponding to the position on the input surface touched by the user, the voltage $V_1$ applied on the end of the resistor $R_T$ on the side of the ground point, and the voltage $V_2$ applied on the end of the resistor $R_T$ on the side of the power supply.

In order to output the voltage V and the like respectively for the X-axis direction and the Y-axis direction, the touch panel 3300 has two resistive films, a resistive film for detecting an X-axis position and a resistive film for detecting a Y-axis position. Those resistive films are provided overlapping each other. In the following description, the resistance $R_T$ of the resistive film for detecting an X-axis position is referred to as resistance $R_{TX}$, and the resistance $R_T$ of the resistive film for detecting a Y-axis position is referred to as resistance $R_{TY}$. Moreover, the voltages $V$, $V_1$, and $V_2$ for the X-axis direction are respectively referred to as voltages $V_X$, $V_{1X}$, and $V_{2X}$, and the voltages $V$, $V_1$, and $V_2$ for the Y-axis direction are respectively referred to as voltages $V_Y$, $V_{1Y}$, and $V_{2Y}$.

Figure 17:
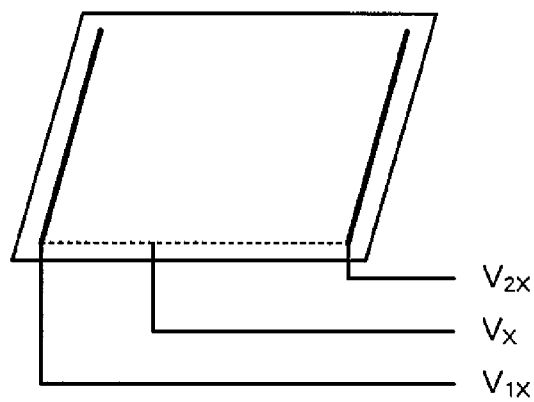
FIG. 17 is a diagram showing various voltage signal lines provided to two resistive films of a touch panel for measuring voltages applied on a touch position, and voltages applied on both ends of the resistive films according to the third embodiment of the present invention.

FIG. 17 is a diagram showing voltage signal lines provided to the two resistive films of the touch panel 3300. FIG. 17(a) is the resistive film for detecting an X-axis position, and respective voltage signal lines are provided for the voltages $V_X$, $V_{1X}$, and $V_{2X}$. These voltage signal lines correspond to the voltage measurement line for X-axis position detection 3111. FIG. 17(b) is the resistive film for detecting a Y-axis position, and respective voltage signal lines are provided for the voltages $V_Y$, $V_{1Y}$, and $V_{2Y}$. Those voltage signal lines correspond to the voltage measurement line for Y-axis position detection 3112.

The touch panel 3300 measures, when the user touches, the voltages $V_X$, $V_{1X}$, $V_{2X}$, $V_Y$, $V_{1Y}$, and $V_{2Y}$, and respectively outputs the voltages $V_X$, $V_{1X}$, and $V_{2X}$ to the voltage measurement line for X-axis position detection 3111, and the voltages $V_Y$, $V_{1Y}$ and $V_{2Y}$ to the voltage measurement line for Y-axis position detection 3112.

The analog switch 3113, while switching between the voltage applied on the touch position on the resistive film for detecting an X-axis position and the voltages applied on the both ends of the resistive film, and the voltage applied on the touch position on the resistive film for detecting a Y-axis position and the voltages applied on the both ends of the resistive film, which are measured by the touch panel 3300, on given timings, causes the respective registers to hold the voltages.

Specifically, the analog switch 3113 is connected to the voltage measurement line for X-axis position detection 3111 and the voltage measurement line for Y-axis position detection 3112, and receives inputs of the voltages $V_X$, $V_{1X}$, $V_{2X}$, $V_Y$, $V_{1Y}$, and $V_{2Y}$. The analog switch 3113 is constituted by three internal switches, an internal switch 3113a for selecting and outputting the input voltage $V_{2X}$ or the input voltage $V_{2Y}$, an internal switch 3113b for selecting and outputting the input voltage $V_{1X}$ or the input voltage $V_{1Y}$, and an internal switch 3113c for selecting and outputting the input voltage $V_X$ or the input voltage $V_Y$.

The analog switch 3113 outputs, while switching the respective internal switches on the given timings, the voltage $V_{1X}$ and the voltage $V_{1Y}$ to the ADC 3115, the voltage $V_{2X}$ and the voltage $V_{2Y}$ to the ADC 3114, and the voltage $V_X$ and the voltage $V_Y$ to the ADC 3116, respectively. More specifically, the analog switch 3113, according to a switching signal input from the sequencer 3127 which is described later, switches the respective internal switches.

The ADCs 3114 to 3116 convert the input voltage values into digital signals, and output the digital signals to the registers 3117X and 3117Y to 3119X and 3119Y (described later), respectively. As a result, the register 3117X, the register 3117Y, the register 3118X, the register 3118Y, the register 3119X, and the register 3119Y respectively hold digital values indicating the voltages $V_{2X}$, $V_{2Y}$, $V_{1X}$, $V_{1Y}$, $V_X$, and $V_Y$.

In this way, the touch panel 3300, on the timings according to the control by the analog switch 3113, outputs the respective voltages. In other words, the analog switch 3113, while switching the respective voltages measured by the touch panel 3300 on the given timings, causes the respective corresponding registers to hold the measured voltages.

The touch operation detection unit 3124 monitors an input of the voltage $V_X$ and the voltage $V_Y$ from the touch panel 3300, and detects, when the input occurs, a touch operation carried out by the user on the input surface (user-specified operation). The touch operation detection unit 3124 monitors whether or not the touch operation is being carried out, and, while the touch operation is being carried out, outputs the touch operation detection information indicating the ongoing touch operation to the logic circuit 3125, the sequencer 3127, and the CPU 3100.

The oscillation unit 3123 oscillates the clock signal at a predetermined cycle.

The logic circuit 3125, when the touch operation detection information is input, inputs the clock signal oscillated by the oscillation unit 3123 to the sequencer 3127. On the other hand, the logic circuit 3125, when the touch operation detection information is not input, does not input the clock signal oscillated by the oscillation unit 3123 to the sequencer 3127.

The sequencer 3127 is switching control means operating according to the touch operation detection information and the clock signal. In other words, the sequencer 3127, by outputting the switching signal to the analog switch 3113 on the timings corresponding to the touch operation detection information and the clock signal, functions as the switching control means for controlling the timings of switching carried out by the analog switch 3113 according to the detection timing of the touch operation. Moreover, the sequencer 3127 outputs latch signals instructing read timings to the respective registers so that, according to the switching timings of the analog switch 3113 according to the switching signal, the respective registers read the digital signals, and hold the digital values.

Figure 18:
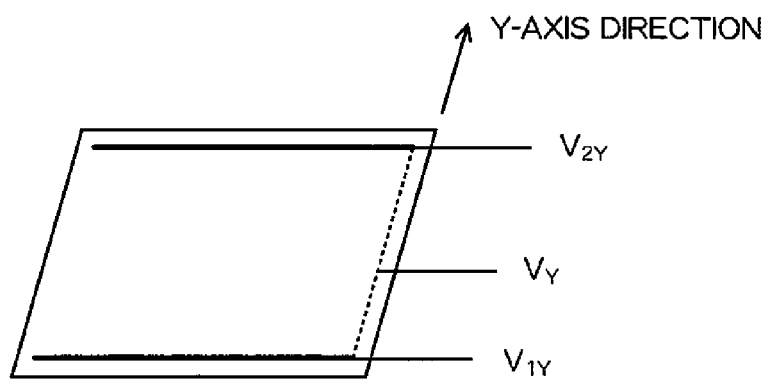
FIG. 18 is an explanatory diagram for describing timings for measuring the voltages in the touch panel control unit according to the third embodiment of the present invention.
Figure 19:
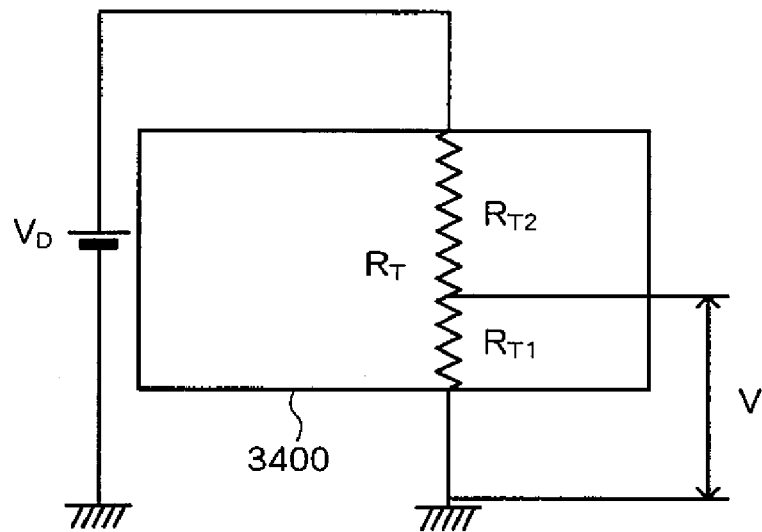
FIG. 19 is a diagram showing an equivalent circuit of an ideal analog resistive touch panel.

With reference to the drawings, a description is now given of the measurement timings of the voltages at the touch position and at the both ends of the resistive films of the touch panel 3300. FIG. 18 is an explanatory diagram for describing the measurement timings of the voltages at the touch position and at the both ends of the resistive films of the touch panel 3300. FIG. 18(1) shows a period in which the touch operation is being detected, FIG. 18(2) shows a period in which the sequencer 3127 is operating, and FIG. 18(3) shows the timings on which the respective voltages are held in the respective registers.

As shown in FIG. 18, the sequencer 3127 starts the operation upon the touch operation, and controls the analog switch 3113 and the respective registers so that the respective registers read the digital signal representing the voltage $V_X$ and the digital signal representing the voltage $V_Y$, each of the voltages applied on the touch position, and the digital signal representing the voltage $V_{1X}$, the digital signal representing the voltage $V_{1Y}$, the digital signal representing the voltage $V_{2X}$, and the digital signal representing the voltage $V_{2Y}$.

Moreover, the sequencer 3127 controls the analog switch 3113 and the respective registers so that, while the touch operation is being carried out, the respective registers repeatedly read the digital signal representing the voltage $V_X$, the digital signal representing the voltage $V_Y$, the digital signal representing the voltage $V_{1X}$, the digital signal representing the voltage $V_{1Y}$, the digital signal representing the voltage $V_{2X}$, and the digital signal representing the voltage $V_{2Y}$ in a predetermined cycle (sampling cycle).

The subtractor 3120X, when the register 3117X or the register 3118X comes to hold a new digital value, calculates $V_{2X}-V_{1X}$ based on the digital values held by the register 3117X and the register 3118X, and outputs a result to the LUT 3122X. Similarly, the subtractor 3120Y, when the register 3117Y or the register 3118Y comes to hold a new digital value, calculates $V_{2Y}-V_{1Y}$ based on the digital values held by the register 3117Y and the register 3118Y, and outputs a result to the LUT 3122Y.

The subtractor 3121X, when the register 3119X comes to hold a new digital value, calculates $V_X-V_{1X}$ based on the digital values held by the register 3118X and the register 3119X, and outputs a result to the LUT 3122X. Similarly, the subtractor 3121Y, when the register 3119Y comes to hold a new digital value, calculates $V_Y-V_{1Y}$ based on the digital values held by the register 3118Y and the register 3119Y, and outputs a result to the LUT 3122Y.

The LUT 3122X stores a look-up table for calculating Equation (3) below. In other words, the look-up table stores $R_{T1X}$ in association with values $\alpha_X$ and $\beta_X$.

$$R_{T1X}=R_{TX}\times\alpha_X/\beta_X \quad (3)$$

Similarly, the LUT 3122Y stores a look-up table for calculating Equation (4). In other words, the look-up table stores $R_{T1Y}$ in association with values $\alpha_Y$ and $\beta_Y$.

$$R_{T1Y}=R_{TY}\times\alpha_Y/\beta_Y \quad (4)$$

When the value $V_{2X}-V_{1X}$ output from the subtractor 3120X is $\beta_X$, and the value $V_X-V_{1X}$ output from the subtractor 3121 is $\alpha_X$, the LUT 3122X refers to the look-up table, thereby acquiring the value $R_{T1X}$. The LUT 3122X, based on the $R_{T1X}$ thus acquired, calculates and acquires the X coordinate of the touch position. Moreover, when the value $V_{2Y}-V_{1Y}$ output from the subtractor 3120Y is $\beta_Y$, and the value $V_Y-V_{1Y}$ output from the subtractor 3121 is $\alpha_Y$, the LUT 3122Y refers to the look-up table, thereby acquiring the value $R_{T1Y}$. The LUT 3122Y, based on the $R_{T1Y}$ thus acquired, calculates and acquires the Y coordinate of the touch position.

The sequencer 3127 outputs latch signals indicating timings on which the LUTs 3122X and 3122Y calculate the respective coordinates of the touch position to the registers 3126X and 3126Y. The register 3126X latches the information representing the X coordinate of the touch position thus acquired on the timing according to the indication of the latch signal, and stores the information in the memory 3107. Similarly, the register 3126Y latches the information representing the Y coordinate of the touch position thus acquired on the timing according to the indication of the latch signal, and stores the information in the memory 3107.

The CPU 3100, while the touch operation detection information is being input from the touch operation detection unit 3124, makes an access to the memory 3107 via the register 3126. Then, the CPU 3100 reads the information respectively indicating the X coordinate and the Y coordinate of the touch position stored in the memory 3107, and carries out a predetermined process according to the respective acquired information pieces.

As described above, since the touch panel control unit 3106, when the touch operation is carried out and while the touch operation is being carried out, measures the voltages applied on the both ends of the resistive films, the touch panel control unit 3106 can precisely calculate the touch position independently of a change in resistances of wiring, and since the touch panel control unit 3106 measures the voltages applied on the both ends of the resistive films only when necessity arises, the power consumption can be low.

It should be noted that the present invention is not limited to the above-mentioned embodiment. For example, according to the above embodiment, as shown in FIG. 18, the register 3119X, the register 3117X, and the register 3118X simultaneously read the digital signal representing the voltage $V_X$, the digital signal representing the voltage $V_Y$, and the digital signal representing the voltage $V_{1X}$, and then, the analog switch 3113 is switched, whereby the register 3119Y, the register 3117Y, and the register 3118Y simultaneously read the digital signal representing the voltage $V_{1Y}$, the digital signal representing the voltage $V_{2X}$, and the digital signal representing the voltage $V_{2Y}$, but the analog switch 3113 and the sequencer 3127 may be configured such that the respective registers, one at a time, read the digital signal representing the voltage $V_X$, the digital signal representing the voltage $V_Y$, the digital signal representing the voltage $V_{1X}$, the digital signal representing the voltage $V_{1Y}$, the digital signal representing the voltage $V_{2X}$, and the digital signal representing the voltage $V_{2Y}$, for example. The timing for the respective registers reading the voltages may thus be modified as appropriate. Moreover, in the above embodiment, the example in which the present invention is applied to the mobile telephone is described, but it is obvious that the present invention, which realizes low power consumption, may be preferably applied to devices powered by batteries. Moreover, in addition, the present invention may be properly applied to any device as long as the device is a touch position acquisition device equipped with an analog resistive touch panel.

The invention claimed is:

1. A display function-equipped coordinate input device, which is a coordinate input device including display means, comprising:
    user-specified operation detection means for detecting a user-specified operation carried out on an input surface;
    coordinate acquisition means for acquiring a coordinate indicating a position on the input surface specified by the user-specified operation detected by the user-specified operation detection means;
    determination means for determining whether one or more coordinates acquired by the coordinate acquisition means meet a predetermined condition; and
    display operation restriction means for restricting, based on a result determined by the determination means, an operation of the display means when the display means is in a state that nothing is displayed but a backlight is on.

2. A display function-equipped coordinate input device according to claim 1, further comprising pattern image information storage means for storing pattern image information indicating a pattern image,
    wherein the determination means determines whether the one or more coordinates acquired by the coordinate acquisition means constitute the pattern image indicated by the pattern image information stored in the pattern image information storage means.

3. A display function-equipped coordinate input device according to claim 1 or 2, further comprising:
    illumination means for illuminating the input surface; and
    illumination means control means for controlling the illumination means according to whether the user-specified operation detection means detects the user-specified operation.

* * * * *